US011172482B2

(12) United States Patent
Vajapeyam et al.

(10) Patent No.: US 11,172,482 B2
(45) Date of Patent: Nov. 9, 2021

(54) TECHNIQUES FOR MANAGING UPLINK TRANSMISSIONS IN A SHARED RADIO FREQUENCY SPECTRUM BAND AND A DEDICATED RADIO FREQUENCY SPECTRUM BAND

(71) Applicant: QUALCOMM Incorporated, San Diego, CA (US)

(72) Inventors: Madhavan Srinivasan Vajapeyam, San Diego, CA (US); Vikas Jain, San Diego, CA (US); Kiran Kumar Somasundaram, San Diego, CA (US); Aleksandar Damnjanovic, Del Mar, CA (US); Fang Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 16/692,139

(22) Filed: Nov. 22, 2019

(65) Prior Publication Data

US 2020/0092887 A1 Mar. 19, 2020

Related U.S. Application Data

(62) Division of application No. 15/199,214, filed on Jun. 30, 2016, now Pat. No. 10,701,692.

(Continued)

(51) Int. Cl.
*H04W 72/04* (2009.01)
*H04W 72/12* (2009.01)
(Continued)

(52) U.S. Cl.
CPC ......... *H04W 72/0453* (2013.01); *H04J 11/00* (2013.01); *H04L 5/0055* (2013.01);
(Continued)

(58) Field of Classification Search
CPC ......... H04W 72/0453; H04W 72/1284; H04W 28/0268; H04W 72/0413; H04W 72/1242; H04W 72/1294; H04L 5/0055
See application file for complete search history.

(56) References Cited

U.S. PATENT DOCUMENTS

| 9,723,618 B2 | 8/2017 | Loehr et al. |
| 10,701,692 B2 | 6/2020 | Vajapeyam et al. |

(Continued)

FOREIGN PATENT DOCUMENTS

| CN | 102761966 A | 10/2012 |
| CN | 104363598 A | 2/2015 |

(Continued)

OTHER PUBLICATIONS

Huawei, Hisilicon, QoS Control LAA UL operation, Apr. 20-24, 2015, 3GPP TSG-RAN WG2 Meeting #89bis, R2-151176, Bratislava, Slovakia.*

(Continued)

*Primary Examiner* — Hashim S Bhatti
(74) *Attorney, Agent, or Firm* — Dalei Dong; Holland & Hart LLP

(57) ABSTRACT

Techniques are described for wireless communication. One method includes identifying a priority parameter associated with data to be transmitted on an uplink carrier; selecting, based at least in part on the identified priority parameter, between a first type of message for requesting uplink resources in a shared radio frequency spectrum band or a dedicated radio frequency spectrum band, or a second type of message for requesting uplink resources in the dedicated radio frequency spectrum band; and transmitting the selected type of message.

18 Claims, 18 Drawing Sheets

Related U.S. Application Data

(60) Provisional application No. 62/203,179, filed on Aug. 10, 2015.

(51) Int. Cl.

| | | |
|---|---|---|
| *H04J 11/00* | (2006.01) | |
| *H04L 5/00* | (2006.01) | |
| *H04L 29/12* | (2006.01) | |
| *H04W 8/08* | (2009.01) | |
| *H04W 28/02* | (2009.01) | |
| *H04W 72/14* | (2009.01) | |
| *H04W 84/12* | (2009.01) | |
| *H04W 88/02* | (2009.01) | |

(52) U.S. Cl.
CPC ......... *H04L 61/6022* (2013.01); *H04W 8/082* (2013.01); *H04W 28/0268* (2013.01); *H04W 28/0273* (2013.01); *H04W 28/0278* (2013.01); *H04W 72/0413* (2013.01); *H04W 72/1284* (2013.01); *H04W 72/14* (2013.01); *H04W 72/1242* (2013.01); *H04W 84/12* (2013.01); *H04W 88/02* (2013.01)

(56) References Cited

U.S. PATENT DOCUMENTS

| | | |
|---|---|---|
| 2007/0201397 A1 | 8/2007 | Zhang |
| 2014/0031052 A1 | 1/2014 | Lagerqvist et al. |
| 2015/0223235 A1 | 8/2015 | Hwang et al. |
| 2016/0023485 A1 | 1/2016 | Campanini |
| 2016/0234858 A1 | 8/2016 | Bao et al. |
| 2017/0013640 A1 | 1/2017 | Loehr et al. |
| 2017/0048857 A1 | 2/2017 | Vajapeyam et al. |
| 2017/0230928 A1 | 8/2017 | Basu et al. |
| 2017/0339568 A1 | 11/2017 | Wang et al. |
| 2018/0070372 A1 | 3/2018 | Yi et al. |
| 2018/0167916 A1 | 6/2018 | Zhang et al. |

FOREIGN PATENT DOCUMENTS

| | | |
|---|---|---|
| EP | 2661138 A1 | 11/2013 |
| EP | 2690919 A1 | 1/2014 |
| WO | 2015046822 A1 | 4/2015 |

OTHER PUBLICATIONS

CATT: "Impact of CA on MAC Layer", 3GPP TSG-RAN WG2 #67, 3GPP Draft; R2-094326, 3rd Generation Partnership Project (3GPP), Mobile Competence Centre; 650, Route Des Lucioles; F-06921 Sophia-Antipolis Cedex; France, No. Shenzhen, China; Aug. 18, 2009, Aug. 18, 2009 (Aug. 18, 2009), 3 Pages, XP050352565, [retrieved on Aug. 18, 2009].

Huawei, et al., "QoS Control in LAA UL Operation", 3GPP TSG-RAN WG2 Meeting #89bis, 3GPP Draft; R2-151176, 3rd Generation Partnership Project (3GPP), Mobile Competence Centre; 650, Route Des Lucioles; F-06921 Sophia-Antipolis Cedex; France vol. RAN WG2, No. Bratislava, Slovakia; Apr. 20-24, 2015, Apr. 19, 2015 (Apr. 19, 2015), pp. 1-4, XP050936150, Retrieved from the Internet: URL:http://www.3gpp.org/ftp/Meetings_3GPP_SYNC/RAN2/Docs/ [retrieved on Apr. 19, 2015].

International Search Report and Written Opinion—PCT/US2016/041135—ISA/EPO—dated Sep. 20, 2016.

European Search Report—EP20176899—Search Authority—The Hague—dated Jun. 15, 2020.

Ericsson: "Further Details on Routing Restrictions in LAA" 3GPP Draft, 3GPP TSG-RAN WG2 Meeting #90, Tdoc R2-152481, May 25-29, 2015, 6 pages.

Samsung: "UL LAA Support and UL Scheduling in MAC" 3GPP Draft, 3GPP TSG-RAN WG2 Meeting #90, R2-152243, May 25-29, 2015, 3 pages.

\* cited by examiner

TECHNIQUES FOR MANAGING UPLINK TRANSMISSIONS IN A SHARED RADIO FREQUENCY SPECTRUM BAND AND A DEDICATED RADIO FREQUENCY SPECTRUM BAND

CROSS REFERENCES

The present Application for Patent is a divisional of U.S. patent application Ser. No. 15/199,214 by Vajapeyam, et al., entitled "Techniques for Managing Uplink Transmissions In A Shared Radio Frequency Spectrum Band and a Dedicated Radio Frequency Spectrum Band" filed Jun. 30, 2016, which claims priority to U.S. Provisional Patent Application No. 62/203,179 by Vajapeyam et al., entitled "Techniques for Managing Uplink Transmissions in a Shared Radio Frequency Spectrum Band and a Dedicated Radio Frequency Spectrum Band," filed Aug. 10, 2015, assigned to the assignee hereof, and which is hereby incorporated by reference in its entirety.

BACKGROUND

Field of the Disclosure

The present disclosure, for example, relates to wireless communication systems, and more particularly to techniques for managing uplink transmissions in a shared radio frequency spectrum band and a dedicated radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communication between a base station and a UE in a shared radio frequency spectrum band, or in different radio frequency spectrum bands (e.g., in a dedicated radio frequency spectrum band and a shared radio frequency spectrum band) of a cellular network. However, in contrast to a carrier in a dedicated radio frequency spectrum band, which may be allocated for use by the devices of one public land mobile network (PLMN) and be available to a base station or a UE of the PLMN at predetermined (or all) times, a carrier in a shared radio frequency spectrum band may be available for use by the devices of the PLMN intermittently. This intermittent availability may be a result of contention for access to the carrier of the shared radio frequency spectrum band, between devices of the PLMN, devices of one or more other PLMNs, and/or other devices (e.g., Wi-Fi devices). For some radio frames, a device of a PLMN may win contention for access to a carrier in the shared radio frequency spectrum band, while for other radio frames, the device may not win contention for access to the carrier in the shared radio frequency spectrum band.

Because of the intermittent availability of carriers in a shared radio frequency spectrum band, a UE may transmit higher priority data over a carrier in a dedicated radio frequency spectrum band.

SUMMARY

The present disclosure, for example, relates to wireless communication systems, and more particularly to techniques for managing uplink transmissions in a shared radio frequency spectrum band and a dedicated radio frequency spectrum band. As previously indicated, because of the intermittent availability of carriers in a shared radio frequency spectrum band, a UE may transmit higher priority data over a carrier in a dedicated radio frequency spectrum band. However, data scheduling mechanisms currently used by Long-Term Evolution (LTE) and LTE-Advanced (LTE-A) do not enable a UE to request uplink resources in a particular radio frequency spectrum band, such as a shared radio frequency spectrum band or a dedicated radio frequency spectrum band. The techniques described in the present disclosure enable a UE to request uplink resources in a shared radio frequency spectrum band or a dedicated radio frequency spectrum band (or any available radio frequency spectrum band) or just in the dedicated radio frequency spectrum band. In this manner, a UE may not only transmit higher priority data over a carrier in the dedicated radio frequency spectrum band, but also request uplink resources in the dedicated radio frequency spectrum band. In some examples, the ability of a UE to request uplink resources in the dedicated radio frequency spectrum band may, for example, speed up Radio Link Control (RLC) retransmissions or increase Transmission Control Protocol (TCP) throughput (while decreasing TCP round-trip times (RTTs)).

Techniques described in the present disclosure also enable a UE to maintain one or more prioritized bit rates (PBRs) for each of one or more logical channels, and to map data to the logical channel(s), in a way that mitigates the chance that a single PBR, associated with logical channel transmissions in both a shared radio frequency spectrum band and a dedicated radio frequency spectrum band, will drain the single PBR as a result of transmissions in the shared radio frequency spectrum band, leaving no PBR for transmissions in the dedicated radio frequency spectrum band.

In one example, a method for wireless communication may include identifying a priority parameter associated with data to be transmitted on an uplink carrier; selecting, based at least in part on the identified priority parameter, between a first type of message for requesting uplink resources in a shared radio frequency spectrum band or a dedicated radio frequency spectrum band, or a second type of message for requesting uplink resources in the dedicated radio frequency spectrum band; and transmitting the selected type of message.

In one example, identifying the priority parameter may further include identifying a first amount of data to be reported in a buffer status report (BSR) message for transmission on the uplink carrier; determining whether the first amount of data requires uplink resources in the shared radio frequency spectrum band or the dedicated radio frequency spectrum band; selecting between a first type of BSR message or a second type of BSR message; and transmitting either the first type of BSR message or the second type of BSR message.

In some embodiments, the first type of BSR message includes data associated with determining whether the first amount of data requires uplink resources. In some embodiments, the second type of BSR message may not include data associated with determining whether the first amount of data requires uplink resources (e.g., whether an indication of whether the first amount of data requires uplink resources is absent from the second type of BSR message.

In some examples of the method, the first type of message may include a first type of scheduling request, and the second type of message may include a second type of scheduling request. In some examples, the method may include receiving, from a base station, a first configuration of a first physical resource on which to transmit the first type of scheduling request, and a second configuration of a second physical resource on which to transmit the second type of scheduling request. In some examples, the first physical resource and the second physical resource may include distinct time resources, frequency resources, and code resources of a physical uplink control channel (PUCCH). In some examples, the first physical resource may be in the shared radio frequency spectrum band and the second physical resource may be in the dedicated radio frequency spectrum band. In some examples, the method may include receiving, from a base station, an indication of a time domain multiplexing configuration for transmitting the first type of scheduling request or the second type of scheduling request on a physical resource. In some examples, the physical resource may be in the dedicated radio frequency spectrum band.

In some examples, the first type of message may include a first type of indication of buffered data to be transmitted on an uplink carrier in the shared radio frequency spectrum band or the dedicated radio frequency spectrum band, and the second type of message may include a second type of indication of buffered data to be transmitted on an uplink carrier in the dedicated radio frequency spectrum band. In some examples, the first type of indication and the second type of indication may be transmitted in a buffer status report (BSR). In some examples, the BSR may be transmitted in the dedicated radio frequency spectrum band. In some examples, the first type of indication may be transmitted in a first BSR, and the second type of indication may be transmitted in a second BSR. In some examples, the first BSR and the second BSR may be transmitted in the dedicated radio frequency spectrum band. In some examples, the data to be transmitted on the uplink carrier may be associated with a logical channel group, and the first type of indication or the second type of indication may be transmitted for the logical channel group. In some examples, the method may include reclassifying, upon expiration of a timer, at least one of: buffered data to be transmitted on an uplink carrier in the dedicated radio frequency spectrum band as buffered data to be transmitted on an uplink carrier in the shared radio frequency spectrum band, or buffered data to be transmitted on an uplink carrier in the shared radio frequency spectrum band as buffered data to be transmitted on an uplink carrier in the dedicated radio frequency spectrum band.

In some examples of the method, the priority parameter may include at least one of: a quality of service (QoS) parameter, a first indication of whether the data includes Medium Access Control (MAC) layer control information, a second indication of whether the data includes upper layer control information, a third indication that the data includes a Transmission Control Protocol (TCP) acknowledgement (ACK), a fourth indication that the data is for a high priority logical channel, or a fifth indication that the data is for an upper layer retransmission.

In one example, an apparatus for wireless communication at a UE is described. The apparatus may include means for identifying a priority parameter associated with data to be transmitted on an uplink carrier; means for selecting, based at least in part on the identified priority parameter, between a first type of message for requesting uplink resources in a shared radio frequency spectrum band or a dedicated radio frequency spectrum band, or a second type of message for requesting uplink resources in the dedicated radio frequency spectrum band; and means for transmitting the selected type of message.

In some examples, the first type of message includes a first type of scheduling request, and the second type of message includes a second type of scheduling request. In some examples, the apparatus may include means for receiving, from a base station, a first configuration of a first physical resource on which to transmit the first type of scheduling request, and a second configuration of a second physical resource on which to transmit the second type of scheduling request. In some examples, the first physical resource and the second physical resource may include distinct time resources, frequency resources, and code resources of a PUCCH. In some examples, the first physical resource may be in the shared radio frequency spectrum band and the second physical resource may be in the dedicated radio frequency spectrum band. In some examples, the apparatus may include means for receiving, from a base station, an indication of a time domain multiplexing configuration for transmitting the first type of scheduling request or the second type of scheduling request on a physical resource. In some examples, the physical resource may be in the dedicated radio frequency spectrum band.

In some examples of the apparatus, the first type of message may include a first type of indication of buffered data to be transmitted on an uplink carrier in the shared radio frequency spectrum band or the dedicated radio frequency spectrum band, and the second type of message may include a second type of indication of buffered data to be transmitted on an uplink carrier in the dedicated radio frequency spectrum band. In some examples, the first type of indication and the second type of indication may be transmitted in a BSR. In some examples, the BSR may be transmitted in the dedicated radio frequency spectrum band. In some examples, the first type of indication may be transmitted in a first BSR, and the second type of indication may be transmitted in a second BSR. In some examples, the first BSR and the second BSR may be transmitted in the dedicated radio frequency spectrum band. In some examples, the data to be transmitted on the uplink carrier may be associated with a logical channel group, and the first type of indication or the second type of indication may be transmitted for the logical channel group. In some examples, the apparatus may include means for reclassifying, upon expiration of a timer, at least one of: buffered data to be transmitted on an uplink carrier in the dedicated radio frequency spectrum band as buffered data to be transmitted on an uplink carrier in the shared radio frequency spectrum band, or buffered data to be transmitted on an uplink carrier in the shared radio frequency spectrum band as buffered data to be transmitted on an uplink carrier in the dedicated radio frequency spectrum band.

In some examples of the apparatus, the priority parameter may include at least one of: a QoS parameter, a first indication of whether the data includes MAC layer control information, a second indication of whether the data includes upper layer control information, a third indication that the data includes a TCP ACK, a fourth indication that the data is for a high priority logical channel, or a fifth indication that the data is for an upper layer retransmission.

In one example, another apparatus for wireless communication at a UE is described. The apparatus may include a processor, memory in electronic communication with the processor, and instructions stored in the memory. The processor and memory may be configured to identify a priority parameter associated with data to be transmitted on an uplink carrier; to select, based at least in part on the identified priority parameter, between a first type of message for requesting uplink resources in a shared radio frequency spectrum band or a dedicated radio frequency spectrum band, or a second type of message for requesting uplink resources in the dedicated radio frequency spectrum band; and to transmit the selected type of message.

In some examples of the apparatus, the first type of message may include a first type of scheduling request, and the second type of message may include a second type of scheduling request. In some examples, the processor and memory may be configured to receive, from a base station, a first configuration of a first physical resource on which to transmit the first type of scheduling request, and a second configuration of a second physical resource on which to transmit the second type of scheduling request. In some examples, the first physical resource may be in the shared radio frequency spectrum band and the second physical resource may be in the dedicated radio frequency spectrum band. In some examples, the processor and memory may be configured to receive, from a base station, an indication of a time domain multiplexing configuration for transmitting the first type of scheduling request or the second type of scheduling request on a physical resource. In some examples, the physical resource is in the dedicated radio frequency spectrum band.

In some examples, the first type of message may include a first type of indication of buffered data to be transmitted on an uplink carrier in the shared radio frequency spectrum band or the dedicated radio frequency spectrum band, and the second type of message may include a second type of indication of buffered data to be transmitted on an uplink carrier in the dedicated radio frequency spectrum band. In some examples, the first type of indication and the second type of indication may be transmitted in a BSR. In some examples, the first type of indication may be transmitted in a first BSR, and the second type of indication may be transmitted in a second BSR. In some examples, the first BSR and the second BSR may be transmitted in the dedicated radio frequency spectrum band.

In one example, a non-transitory computer-readable medium storing computer-executable code for wireless communication is described. The code may be executable by a processor to identify a priority parameter associated with data to be transmitted on an uplink carrier; select, based at least in part on the identified priority parameter, between a first type of message for requesting uplink resources in a shared radio frequency spectrum band or a dedicated radio frequency spectrum band, or a second type of message for requesting uplink resources in the dedicated radio frequency spectrum band; and transmit the selected type of message.

In some examples of the non-transitory computer-readable medium, the first type of message may include a first type of scheduling request, and the second type of message may include a second type of scheduling request. In some examples, the first type of message may include a first type of indication of buffered data to be transmitted on an uplink carrier in the shared radio frequency spectrum band or the dedicated radio frequency spectrum band, and the second type of message may include a second type of indication of buffered data to be transmitted on an uplink carrier in the dedicated radio frequency spectrum band.

In one example, another method for wireless communication at a UE is described. The method may include maintaining a first PBR and a second PBR for each of one or more logical channels, where the first PBR is associated with transmissions in a shared radio frequency spectrum band and a dedicated radio frequency spectrum band, and the second PBR is associated with transmissions in the dedicated radio frequency spectrum band. The method may also include mapping at least a portion of data associated with a logical channel of the one or more logical channels to resources of one or more uplink grants according to the first PBR for the logical channel and the second PBR for the logical channel.

In one example, another apparatus for wireless communication at a UE is described. The apparatus may include means for maintaining a first PBR and a second PBR for each of one or more logical channels, where the first PBR is associated with transmissions in a shared radio frequency spectrum band and a dedicated radio frequency spectrum band, and the second PBR is associated with transmissions in the dedicated radio frequency spectrum band. The apparatus may also include means for mapping at least a portion of data associated with a logical channel of the one or more logical channels to resources of one or more uplink grants according to the first PBR for the logical channel and the second PBR for the logical channel.

In one example, another apparatus for wireless communication at a UE is described. The apparatus may include a processor, memory in electronic communication with the processor, and instructions stored in the memory. The processor and memory may be configured to maintain a first PBR and a second PBR for each of one or more logical channels, where the first PBR is associated with transmissions in a shared radio frequency spectrum band and a dedicated radio frequency spectrum band, and the second PBR is associated with transmissions in the dedicated radio frequency spectrum band. The instructions may also be executable by the processor to map at least a portion of data associated with a logical channel of the one or more logical channels to resources of one or more uplink grants according to the first PBR for the logical channel and the second PBR for the logical channel.

In one example, another non-transitory computer-readable medium storing computer-executable code for wireless communication is described. The code may be executable by a processor to maintain a first PBR and a second PBR for each of one or more logical channels, where the first PBR is associated with transmissions in a shared radio frequency spectrum band and a dedicated radio frequency spectrum band, and the second PBR is associated with transmissions in the dedicated radio frequency spectrum band. The code may also be executable by a processor to map at least a portion of data associated with a logical channel of the one or more logical channels to resources of one or more uplink grants according to the first PBR for the logical channel and the second PBR for the logical channel.

In one example, another method for wireless communication at UE is described. The method may include communicating on a first uplink carrier in a dedicated radio frequency spectrum band and a second uplink carrier in a shared radio frequency spectrum band; maintaining a PBR for each of a plurality of logical channels to determine a nominal scheduling priority of the plurality of logical channels; receiving an uplink grant for the first uplink carrier in the dedicated radio frequency spectrum band; and mapping at least a portion of data associated with a logical channel of the plurality of logical channels to resources of the uplink grant according to a logical channel priority applied independently of the nominal scheduling priority. In some examples, the at least portion of the data associated with the logical channel may include at least one of: an upper layer retransmission, upper layer control information, or a Transmission Control Protocol TCP ACK.

In one example, another apparatus for wireless communication at a UE is described. The apparatus may include means for communicating on a first uplink carrier in a dedicated radio frequency spectrum band and a second uplink carrier in a shared radio frequency spectrum band; means for maintaining a PBR for each of a plurality of logical channels to determine a nominal scheduling priority of the plurality of logical channels; means for receiving an uplink grant for the first uplink carrier in the dedicated radio frequency spectrum band; and means for mapping at least a portion of data associated with a logical channel of the plurality of logical channels to resources of the uplink grant according to a logical channel priority applied independently of the nominal scheduling priority. In some examples, the at least portion of the data associated with the logical channel may include at least one of: an upper layer retransmission, upper layer control information, or a TCP ACK.

In one example, another apparatus for wireless communication at a UE is described. The apparatus may include a processor, memory in electronic communication with the processor, and instructions stored in the memory. The processor and memory may be configured to communicate on a first uplink carrier in a dedicated radio frequency spectrum band and a second uplink carrier in a shared radio frequency spectrum band; maintain a PBR for each of a plurality of logical channels to determine a nominal scheduling priority of the plurality of logical channels; receive an uplink grant for the first uplink carrier in the dedicated radio frequency spectrum band; and map at least a portion of data associated with a logical channel of the plurality of logical channels to resources of the uplink grant according to a logical channel priority applied independently of the nominal scheduling priority.

In one example, another non-transitory computer-readable medium storing computer-executable code for wireless communication is described. The code may be executable by a processor to communicate on a first uplink carrier in a dedicated radio frequency spectrum band and a second uplink carrier in a shared radio frequency spectrum band; maintain a PBR for each of a plurality of logical channels to determine a nominal scheduling priority of the plurality of logical channels; receive an uplink grant for the first uplink carrier in the dedicated radio frequency spectrum band; and map at least a portion of data associated with a logical channel of the plurality of logical channels to resources of the uplink grant according to a logical channel priority applied independently of the nominal scheduling priority.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
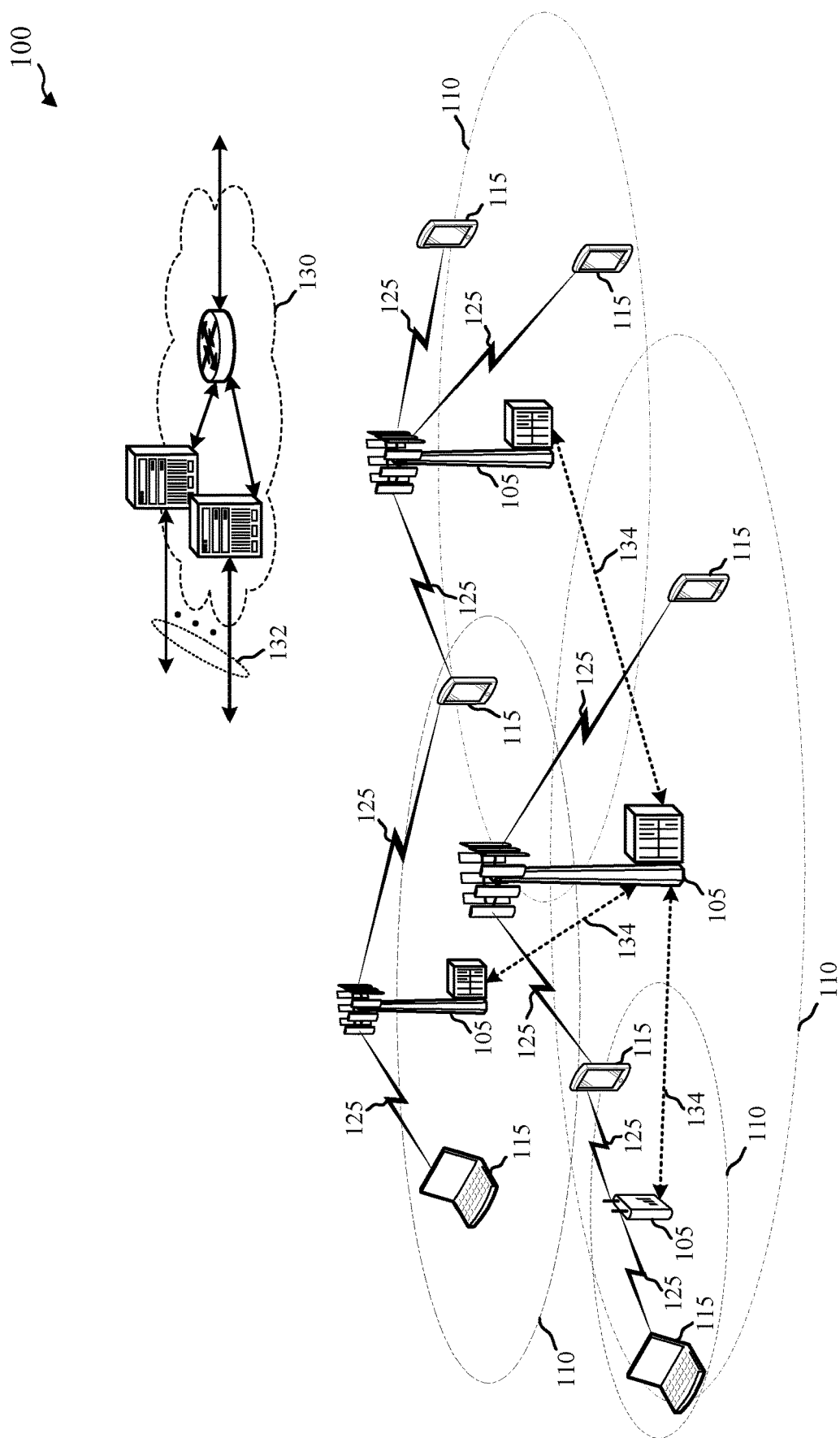
FIG. 1 illustrates an example of a wireless communication system, in accordance with various aspects of the present disclosure.

Techniques are described in which a shared radio frequency spectrum band is used for at least a portion of communications over a wireless communication system. In some examples, the shared radio frequency spectrum band may be used for LTE/LTE-A communications. The shared radio frequency spectrum band may be used in combination with, or independent from, a dedicated radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

With increasing data traffic in cellular networks that use a dedicated radio frequency spectrum band, offloading of at least some data traffic to a shared radio frequency spectrum band may provide a cellular operator (e.g., an operator of a PLMN or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. Before communicating over a shared radio frequency spectrum band, a transmitting apparatus may perform a Listen-Before-Talk (LBT) procedure to gain access to the shared radio frequency spectrum band. Such an LBT procedure may include performing a clear channel assessment (CCA) procedure (or extended CCA procedure) to identify a channel (or carrier) of the shared radio frequency spectrum band is available. When it is determined that the channel of the shared radio frequency spectrum band is available, a channel reservation signal (e.g., a channel usage beacon signal (CUBS)) may be transmitted to reserve the channel. When it is determined that a channel is not available, a CCA procedure (or extended CCA procedure) may be performed for the channel again at a later time.

Because a device may win or lose contention for access to a channel of a shared radio frequency spectrum band for a given time interval, based on the unknown and possibly random activity of one or more other devices, access to the shared radio frequency spectrum band cannot be guaranteed. The lack of guaranteed access to a shared radio frequency spectrum band can interfere with uplink transmissions associated with higher priorities. The techniques described in the present disclosure enable a UE to request uplink resources in a dedicated radio frequency spectrum band (e.g., when needed for higher priority transmissions), and enable the UE to map higher priority transmissions to the uplink resources in the dedicated radio frequency spectrum band.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A RLC layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the RRC protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. (collectively referred to as "data" in some cases in this disclosure). The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five component carriers (CCs) when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some examples, the wireless communication system 100 may support operation over a dedicated radio frequency spectrum band (e.g., a radio frequency spectrum band for which transmitting apparatuses may not contend for access because the radio frequency spectrum band is licensed to particular users for particular uses (e.g., a licensed radio frequency spectrum band usable for LTE/LTE-A communications)) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)).

Upon winning a contention for access to the shared radio frequency spectrum band, a transmitting apparatus (e.g., a base station 105 or UE 115) may transmit one or more CUBS over the shared radio frequency spectrum band. The CUBS may reserve the shared radio frequency spectrum band by providing a detectable energy on the shared radio frequency spectrum band. The CUBS may also serve to identify the transmitting apparatus or serve to synchronize the transmitting apparatus and a receiving apparatus.

Figure 2:
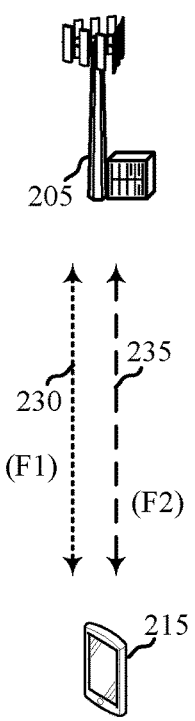
FIG. 2 shows a wireless communication system in which LTE/LTE-A may be deployed under a licensed-assisted access (LAA) CA mode using a shared radio frequency spectrum band, in accordance with various aspects of the present disclosure.

FIG. 2 shows a wireless communication system 200 in which LTE/LTE-A may be deployed under a licensed-assisted access (LAA) CA mode using a shared radio frequency spectrum band, in accordance with various aspects of the present disclosure. The wireless communication system 200 may be an example of portions of the wireless communication system 100 described with reference to FIG. 1. Moreover, a base station 205 may be an example of aspects of one or more of the base stations 105 described with reference to FIG. 1, while a UE 215 may be examples of aspects of one or more of the UEs 115 described with reference to FIG. 1.

In one example of a LAA CA mode in the wireless communication system 200, the base station 205 may transmit OFDMA waveforms to the UE 215 using a first bidirectional link 230 and may receive OFDMA waveforms, SC-FDMA waveforms, or resource block interleaved FDMA waveforms from the UE 215 using the first bidirectional link 230. The first bidirectional link 230 may be associated with a frequency F1 in the shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The base station 205 may also transmit OFDMA waveforms to the UE 215 using a second bidirectional link 235 and may receive SC-FDMA waveforms from the UE 215 using the second bidirectional link 235. The second bidirectional link 235 may be associated with a frequency F2 in a dedicated radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The first bidirectional link 230 may provide a downlink and uplink capacity offload for the base station 205. This example may occur when a service provider (e.g., a mobile network operator (MNO)) uses a dedicated radio frequency spectrum band and relieves traffic or signaling congestion using a shared radio frequency spectrum band. This example is presented for illustrative purposes and there may be other similar modes of operation or deployment scenarios that combine LTE/LTE-A communication in a dedicated radio frequency spectrum band with LTE/LTE-A communication in a shared radio frequency spectrum band for capacity offload.

As described above, one type of service provider that may benefit from the capacity offload offered by using LTE/LTE-A in a shared radio frequency spectrum band is a traditional MNO having access rights to an LTE/LTE-A dedicated radio frequency spectrum band. For these service providers, an operational example may include a bootstrapped mode that uses a LTE/LTE-A PCC on the dedicated radio frequency spectrum band and at least one SCC on the shared radio frequency spectrum band.

In the LAA CA mode, data and control signals may, for example, be communicated in the dedicated radio frequency spectrum band (e.g., via the second bidirectional link 235) while data may, for example, be communicated in the shared radio frequency spectrum band (e.g., via the first bidirectional link 230). Alternatively, control signals may also be communicated in the shared radio frequency spectrum band. In some examples, the carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In some examples, a transmitting apparatus such as one of the base stations 105 or 205 described with reference to FIG. 1 or 2, or one of the UEs 115 or 215 described with reference to FIG. 1 or 2, may use a gating interval to gain access to a channel of a shared radio frequency spectrum band (e.g., to a physical channel of the shared radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a CCA procedure. The outcome of the CCA procedure may indicate to the transmitting apparatus whether a channel of a shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
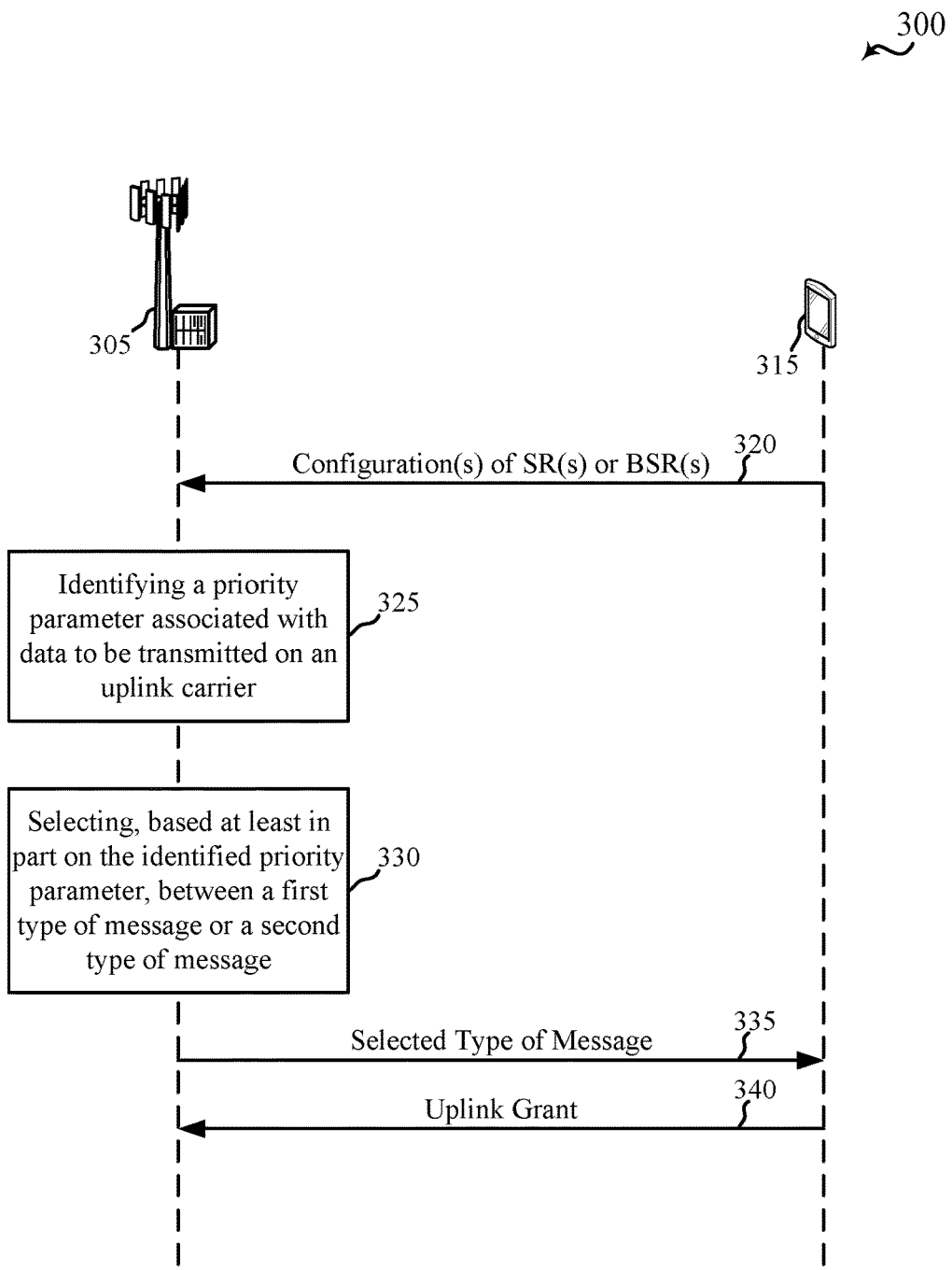
FIG. 3 shows a message flow for requesting uplink resources in a shared radio frequency spectrum band, in accordance with various aspects of the present disclosure.

FIG. 3 shows a message flow 300 for requesting uplink resources in a shared radio frequency spectrum band, in accordance with various aspects of the present disclosure. The messages may be transmitted between a base station 305 and a UE 315. The base station 305 may be an example of aspects of the base station 105 or 205 described with reference to FIG. 1 or 2, and the UE 315 may be an example of aspects of the UE 115 or 215 described with reference to FIG. 1 or 2.

At 320, the base station 305 may optionally transmit, to the UE 315, a configuration of one or more types of scheduling request (SR) or buffer status report (BSR). Alternatively, the UE 315 may be provided the configuration(s) in another way (e.g., during a software install or update). The one or more types of scheduling request or buffer status report may enable the UE 315 to request uplink resources in a shared radio frequency spectrum band or a dedicated radio frequency spectrum band when data may be transmitted in either the shared radio frequency spectrum band or the dedicated radio frequency spectrum band (e.g., when the data is associated with a lower priority and may not be affected by delays caused by waiting to win contention for access to the shared radio frequency spectrum band). The one or more types of scheduling request or buffer status report may also enable the UE 315 to request uplink resources in the dedicated radio frequency spectrum band when data is associated with a higher priority and transmission of the data may be adversely impacted by delays caused by waiting to win contention for access to the shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications).

At 325, the UE 315 may identify a priority parameter associated with data to be transmitted on an uplink carrier. In some examples, the priority parameter may include at least one of a quality of service (QoS) parameter, a first indication of whether the data comprises MAC layer control information (e.g., a buffer status report (BSR) or a power headroom report (PHR)), a second indication of whether the data comprises upper layer control information (e.g., RRC signaling, a RLC STATUS protocol data unit (PDU), a RLC Poll PDU, or PDCP or higher layer control information (e.g., robust header compression (RoHC) control information, if Voice over LTE (VoLTE) is supported), a third indication that the data comprises a TCP ACK, a fourth indication that the data is for a high priority logical channel, or a fifth indication that the data is for an upper layer retransmission (e.g., a RLC retransmission). In some examples, the UE 315 may identify a first amount of data to be reported in a BSR message for transmission on the uplink carrier.

At 330, the UE 315 may select, based at least in part on the identified priority parameter, between a first type of message (e.g., a first type of scheduling request or first type of indication of buffered data) for requesting uplink resources in a shared radio frequency spectrum band or a dedicated radio frequency spectrum band, or a second type of message (e.g., a second type of scheduling request or second type of indication of buffered data) for requesting uplink resources in the dedicated radio frequency spectrum band. In some examples, the first type of message may include a first type of scheduling request for uplink resources in the shared radio frequency spectrum band or the dedicated radio frequency spectrum band, and the second type of message may include a second type of scheduling request for uplink resources in the dedicated radio frequency spectrum band. In some examples, the first type of message may include a first type of indication of buffered data to be transmitted on an uplink carrier in the shared radio frequency spectrum band or the dedicated radio frequency spectrum band, and the second type of message may include a second type of indication of buffered data to be transmitted on an uplink carrier in the dedicated radio frequency spectrum band.

If the UE has identified a first amount of data to be reported in a BSR message for transmission on the uplink carrier, at 330, the UE may determine whether the first amount of data requires uplink resources in the shared radio frequency spectrum band or the dedicated radio frequency spectrum band At 335, the UE 315 may transmit, to the base station 305, the selected type of message. The message may be transmitted over the shared radio frequency spectrum band or the dedicated radio frequency spectrum band, as described with reference to FIG. 6, 7, 13, 14, 15, or 16. If the messages are BSR messages, at 335 the UE may select between a first type of BSR message or a second type of BSR message, where the first type of BSR message includes data associated with determining whether the first amount of data requires uplink resources, and where the second type of BSR message does not include data associated with determining whether the first amount of data requires uplink resources. At 340, the base station 305 may transmit an uplink grant to the UE 315. The uplink grant may be transmitted on the shared radio frequency spectrum band or the dedicated radio frequency spectrum band, and may grant uplink resources on the shared radio frequency spectrum band or the dedicated radio frequency spectrum band, depending on the type of message transmitted at 335.

Figure 4:
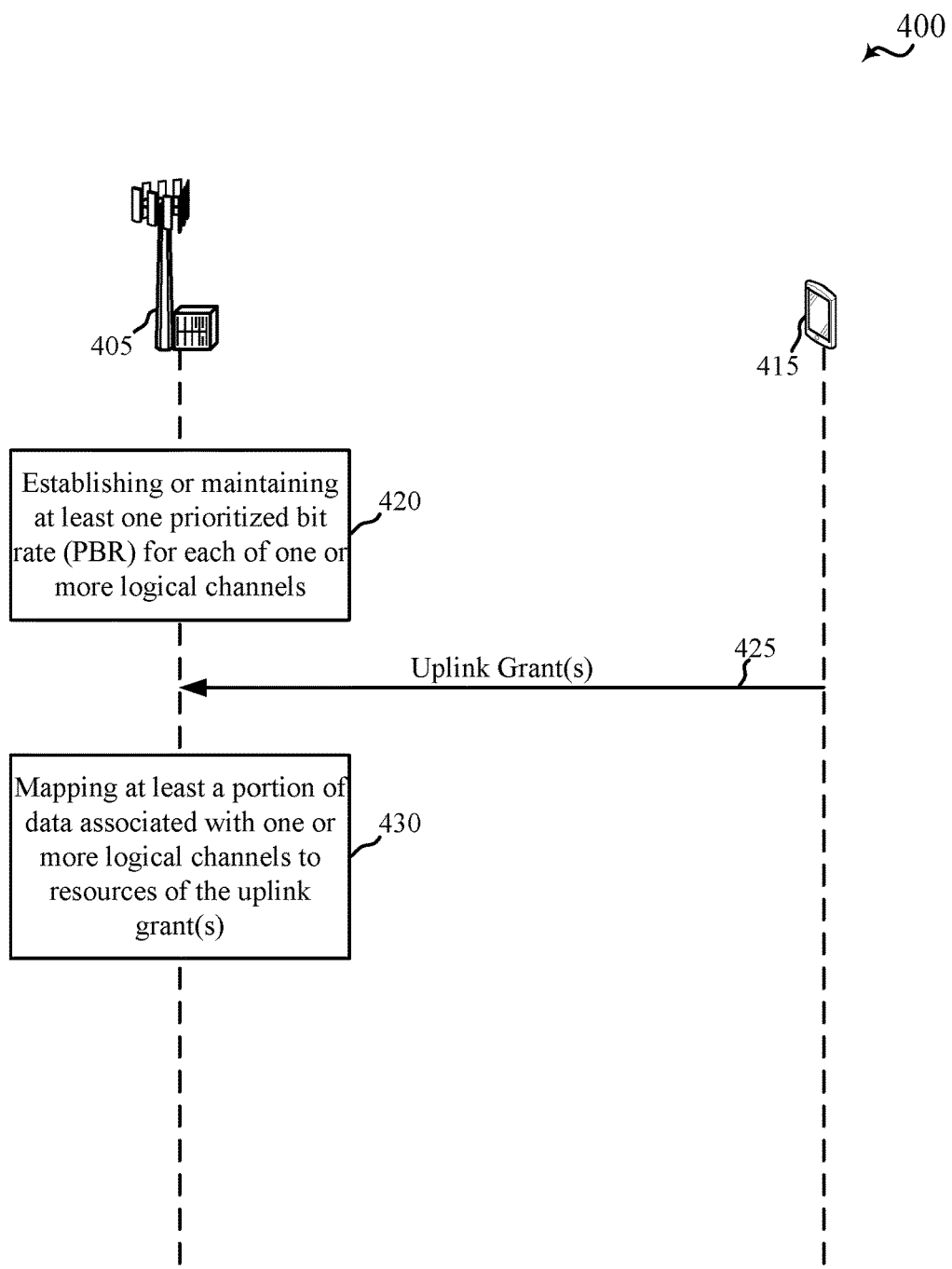
FIG. 4 shows a message flow for mapping data associated with one or more logical channels to resources of one or more uplink grants, in accordance with various aspects of the present disclosure.

FIG. 4 shows a message flow 400 for mapping data associated with one or more logical channels to resources of one or more uplink grants, in accordance with various aspects of the present disclosure. The messages may be transmitted between a base station 405 and a UE 415. The base station 405 may be an example of aspects of the base station 105, 205, or 305 described with reference to FIG. 1, 2, or 3, and the UE 415 may be an example of aspects of the UE 115, 215, or 315 described with reference to FIG. 1, 2, or 3.

The base station 405 and the UE 415 may communicate on one or more of a first uplink carrier in a dedicated radio frequency spectrum band and a second uplink carrier in a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

At 420, the UE 415 may establish or maintain at least one prioritized bit rate (PBR) for each of one or more logical channels. In some examples, the UE 415 may establish or maintain a single PBR (e.g., a single PBR for transmissions in the shared radio frequency spectrum band and the dedicated radio frequency spectrum band) for each of a plurality of logical channels to determine a nominal scheduling priority of the plurality of logical channels. In some examples, the UE 415 may establish or maintain a first PBR and a second PBR for each of one or more logical channels. The first PBR may be associated with transmissions in the shared radio frequency spectrum band or the dedicated radio frequency spectrum band, and the second PBR may be associated with transmissions in the dedicated radio frequency spectrum band.

At 425, the base station 405 may transmit, to the UE 415, one or more uplink grants. The uplink grants may include one or more uplink grants for resources in the dedicated radio frequency spectrum band and/or one or more uplink grants for resources in the shared radio frequency spectrum band.

At 430, the UE 415 may map data associated with one or more logical channels to resources of the one or more uplink grants. In some examples, the UE 415 may map at least a portion of data associated with a logical channel to resources of an uplink grant according to a logical channel priority applied independently of a nominal scheduling priority. In other examples, the UE 415 may map at least a portion of data associated with a logical channel to resources of one or more of the uplink grants according to a first PBR (associated with transmissions in the shared radio frequency spectrum band or the dedicated radio frequency spectrum band) for the logical channel and a second PBR (associated with transmissions in the dedicated radio frequency spectrum band) for the logical channel. In some examples, the at least portion of the data associated with the logical channel may include at least one of an upper layer retransmission, upper layer control information, or a TCP ACK.

The mapping(s) performed at 430 may mitigate the chance that a single PBR, associated with logical channel transmissions in both the shared radio frequency spectrum band and the dedicated radio frequency spectrum band, will drain the single PBR as a result of transmissions in the shared radio frequency spectrum band, leaving no PBR for transmissions in the dedicated radio frequency spectrum band. In some examples, the transmissions in the dedicated radio frequency spectrum band may be associated with a higher priority than the transmissions in the shared radio frequency spectrum band.

Figure 5:
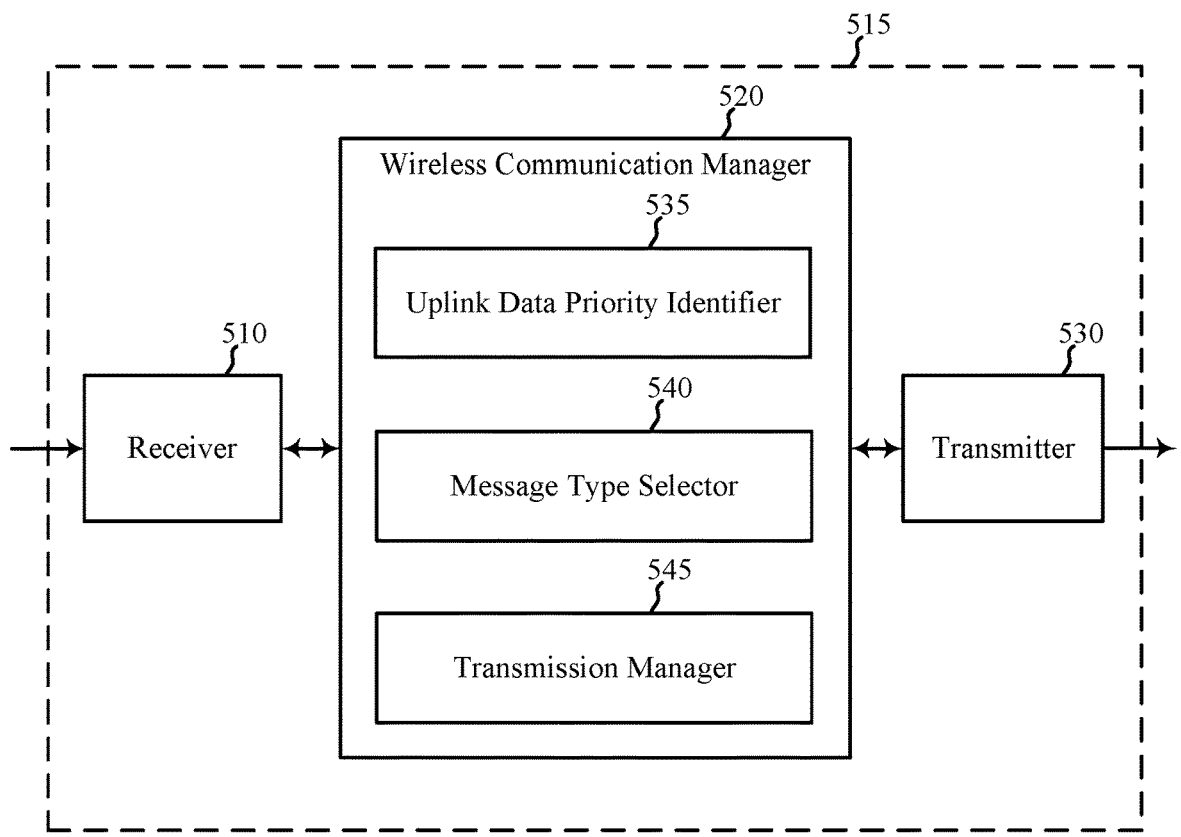
FIG. 5 shows a block diagram of an apparatus for use in wireless communication, in accordance with various aspects of the present disclosure.

FIG. 5 shows a block diagram 500 of an apparatus 515 for use in wireless communication, in accordance with various aspects of the present disclosure. The apparatus 515 may be an example of aspects of one or more of the UEs 115, 215, 315, or 415 described with reference to FIG. 1, 2, 3, or 4. The apparatus 515 may also be or include a processor. The apparatus 515 may include a receiver 510, a wireless communication manager 520, or a transmitter 530. Each of these components may be in communication with each other.

The components of the apparatus 515 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 510 may include at least one radio frequency (RF) receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, or 4. The receiver 510 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the transmitter 530 may include at least one RF transmitter, such as at least one RF transmitter operable to transmit over the dedicated radio frequency spectrum band or the shared radio frequency spectrum band. The transmitter 530 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 520 may be used to manage one or more aspects of wireless communication for the apparatus 515. In some examples, part of the wireless communication manager 520 may be incorporated into or shared with the receiver 510 or the transmitter 530. In some examples, the wireless communication manager 520 may include an uplink data priority identifier 535, a message type selector 540, or a transmission manager 545.

The uplink data priority identifier 535 may be used to identify a priority parameter associated with data to be transmitted on an uplink carrier. In some examples, the priority parameter may include at least one of a QoS parameter, a first indication of whether the data comprises MAC layer control information, a second indication of whether the data comprises upper layer control information, a third indication that the data comprises a TCP ACK, a fourth indication that the data is for a high priority logical channel, or a fifth indication that the data is for an upper layer retransmission. Identifying the priority parameter may further include identifying a first amount of data to be reported in a buffer status report (BSR) message for transmission on the uplink carrier. In some examples, the uplink data priority identifier 535 may determine whether the first amount of data requires uplink resources in the shared radio frequency spectrum band or the dedicated radio frequency spectrum band. In other examples, another component may make the determination.

The message type selector 540 may be used to select, based at least in part on the identified priority parameter, between a first type of message for requesting uplink resources in the shared radio frequency spectrum band or the dedicated radio frequency spectrum band, or a second type of message may for requesting uplink resources in the dedicated radio frequency spectrum band. In some examples, the first type of message may include a first type of scheduling request for uplink resources in the shared radio frequency spectrum band or the dedicated radio frequency spectrum band, and the second type of message may include a second type of scheduling request for uplink resources in the dedicated radio frequency spectrum band. In some examples, the first type of message may include a first type of indication of buffered data to be transmitted on an uplink carrier in the shared radio frequency spectrum band or the dedicated radio frequency spectrum band, and the second type of message may include a second type of indication of buffered data to be transmitted on an uplink carrier in the dedicated radio frequency spectrum band. In some examples, selecting may include selecting between a first type of BSR message or a second type of BSR message; and transmitting either the first type of BSR message or the second type of BSR message.

The transmission manager 545 may be used to transmit the selected type of message (e.g., to a base station).

Figure 6:
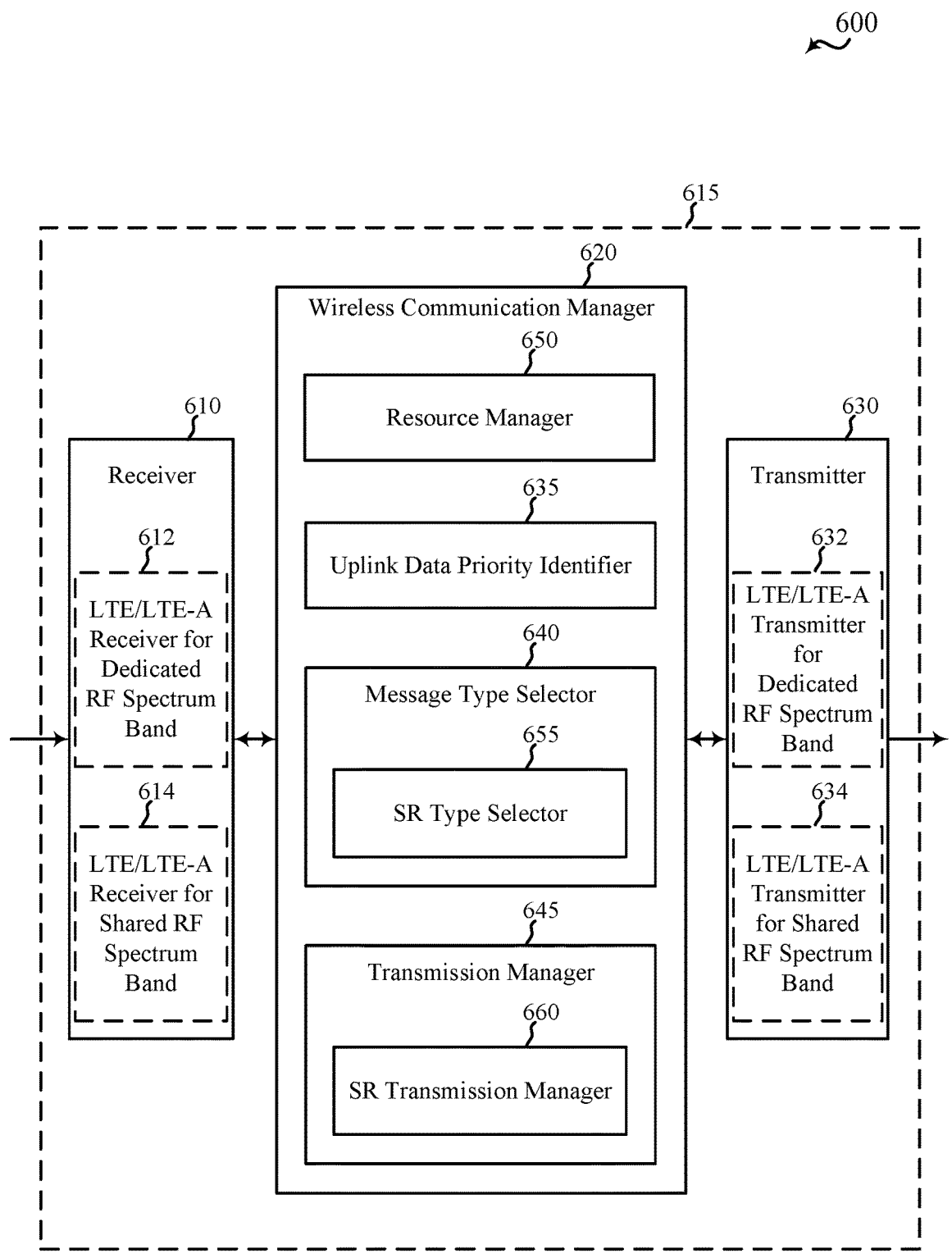
FIG. 6 shows a block diagram of an apparatus for use in wireless communication, in accordance with various aspects of the present disclosure.

FIG. 6 shows a block diagram 600 of an apparatus 615 for use in wireless communication, in accordance with various aspects of the present disclosure. The apparatus 615 may be an example of aspects of one or more of the UEs 115, 215, 315, or 415 described with reference to FIG. 1, 2, 3, or 4, or aspects of the apparatus 515 described with reference to FIG. 5. The apparatus 615 may also be or include a processor. The apparatus 615 may include a receiver 610, a wireless communication manager 620, or a transmitter 630. Each of these components may be in communication with each other.

The components of the apparatus 615 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 610 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, or 4. The receiver 610 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 612), and an LTE/LTE-A receiver for communicating over the shared radio frequency spectrum band (e.g., LTE/LTE-A receiver for shared RF spectrum band 614). The receiver 610, including the LTE/LTE-A receiver for dedicated RF spectrum band 612 or the LTE/LTE-A receiver for shared RF spectrum band 614, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 630 may include at least one RF transmitter, such as at least one RF transmitter operable to transmit over the dedicated radio frequency spectrum band or the shared radio frequency spectrum band. The transmitter 630 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 632), and an LTE/LTE-A transmitter for communicating over the shared radio frequency spectrum band (e.g., LTE/LTE-A transmitter for shared RF spectrum band 634). The transmitter 630, including the LTE/LTE-A transmitter for dedicated RF spectrum band 632 or the LTE/LTE-A transmitter for shared RF spectrum band 634, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 620 may be used to manage one or more aspects of wireless communication for the apparatus 615. In some examples, part of the wireless communication manager 620 may be incorporated into or shared with the receiver 610 or the transmitter 630. In some examples, the wireless communication manager 620 may include a resource manager 650, an uplink data priority identifier 635, a message type selector 640, or a transmission manager 645.

In some examples, the resource manager 650 may be used to receive, from a base station, a first configuration of a first physical resource on which to transmit the first type of scheduling request, and a second configuration of a second physical resource on which to transmit the second type of scheduling request. The first type of scheduling request may be for uplink resources in the shared radio frequency spectrum band or the dedicated radio frequency spectrum band, and the second type of scheduling request may be for uplink resources in the dedicated radio frequency spectrum band. In some examples, the first physical resource may be in the shared radio frequency spectrum band and the second physical resource may be in the dedicated radio frequency spectrum band. In some examples, the first physical resource and the second physical resource may include distinct time resources, frequency resources, and code resources of a PUCCH.

In other examples, the resource manager 650 may be used to receive, from a base station, an indication of a time domain multiplexing configuration for transmitting the first type of scheduling request or the second type of scheduling request on a third physical resource. In some examples, the third physical resource may be in the dedicated radio frequency spectrum band.

The uplink data priority identifier 635 may be used to identify a priority parameter associated with data to be transmitted on an uplink carrier. In some examples, the priority parameter may include at least one of a QoS parameter, a first indication of whether the data comprises MAC layer control information, a second indication of whether the data comprises upper layer control information, a third indication that the data comprises a TCP ACK, a fourth indication that the data is for a high priority logical channel, or a fifth indication that the data is for an upper layer retransmission.

The message type selector 640 may include a SR type selector 655. The SR type selector 655 may be used to select, based at least in part on the identified priority parameter, between the first type of scheduling request or the second type of scheduling request.

The transmission manager 645 may include a SR transmission manager 660. In some examples, the SR transmission manager 665 may be used to transmit the first type of scheduling request, using the first physical resource, when the first type of scheduling request is selected, or to transmit the second type of scheduling request, using the second physical resource, when the second type of scheduling request is selected. In other examples, the SR transmission manager 665 may be used to transmit the first type of scheduling request or the second type of scheduling request using a first occurrence of the third physical resource (e.g., for the first type of scheduling request) or a second occurrence of the third physical resource (e.g., for the second type of scheduling request 0, in accordance with the time domain multiplexing configuration of the third physical resource. The first type of scheduling request or second type of scheduling request may be transmitted to a base station.

Figure 7:
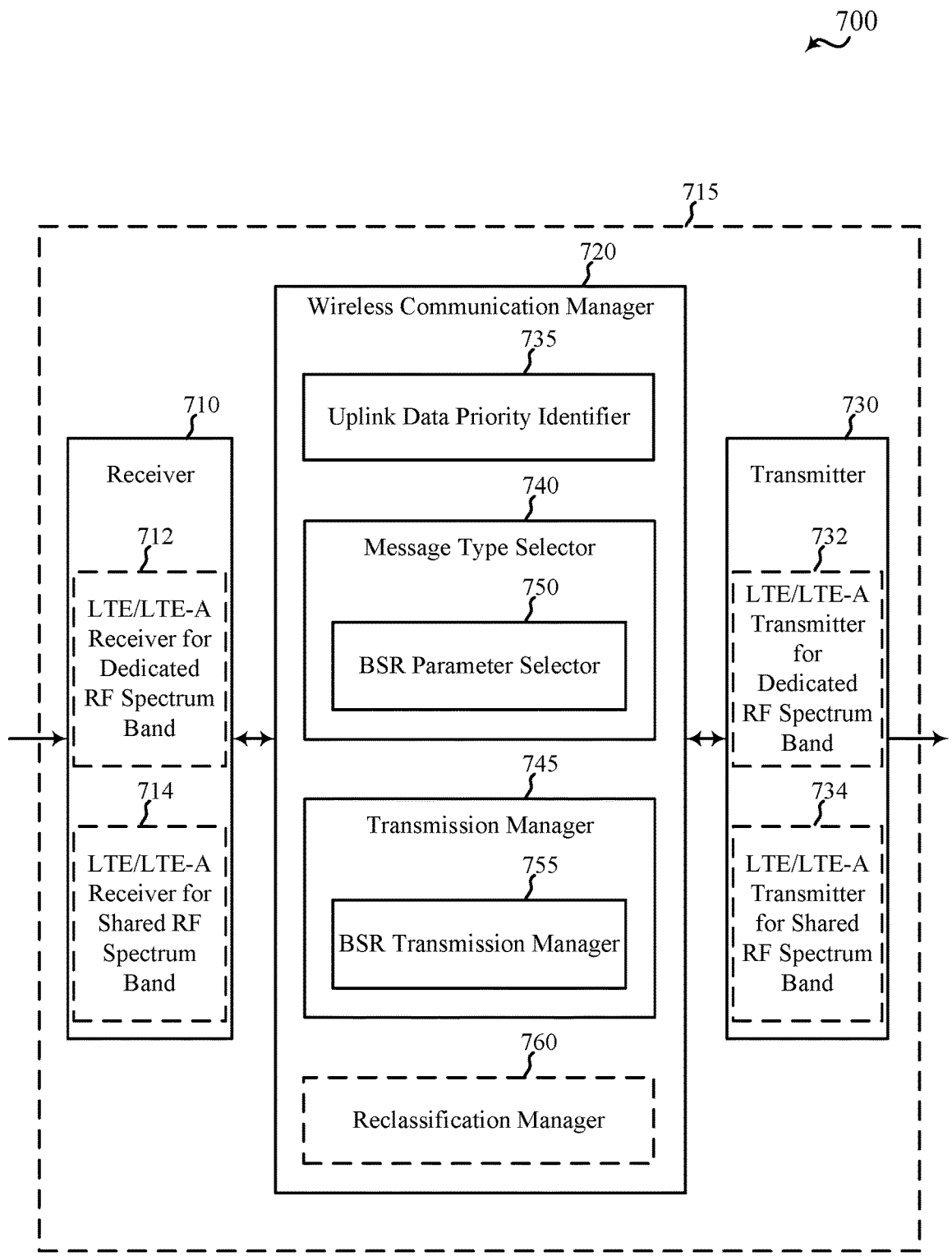
FIG. 7 shows a block diagram of an apparatus for use in wireless communication, in accordance with various aspects of the present disclosure.

FIG. 7 shows a block diagram 700 of an apparatus 715 for use in wireless communication, in accordance with various aspects of the present disclosure. The apparatus 715 may be an example of aspects of one or more of the UEs 115, 215, 315, or 415 described with reference to FIG. 1, 2, 3, or 4, or aspects of the apparatus 515 described with reference to FIG. 5. The apparatus 715 may also be or include a processor. The apparatus 715 may include a receiver 710, a wireless communication manager 720, or a transmitter 730. Each of these components may be in communication with each other.

The components of the apparatus 715 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, or 4. The receiver 710 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 712), and an LTE/LTE-A receiver for communicating over the shared radio frequency spectrum band (e.g., LTE/LTE-A receiver for shared RF spectrum band 714). The receiver 710, including the LTE/LTE-A receiver for dedicated RF spectrum band 712 or the LTE/LTE-A receiver for shared RF spectrum band 714, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 730 may include at least one RF transmitter, such as at least one RF transmitter operable to transmit over the dedicated radio frequency spectrum band or the shared radio frequency spectrum band. The transmitter 730 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 732), and an LTE/LTE-A transmitter for communicating over the shared radio frequency spectrum band (e.g., LTE/LTE-A transmitter for shared RF spectrum band 734). The transmitter 730, including the LTE/LTE-A transmitter for dedicated RF spectrum band 732 or the LTE/LTE-A transmitter for shared RF spectrum band 734, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 720 may be used to manage one or more aspects of wireless communication for the apparatus 715. In some examples, part of the wireless communication manager 720 may be incorporated into or shared with the receiver 710 or the transmitter 730. In some examples, the wireless communication manager 720 may include an uplink data priority identifier 735, a message type selector 740, or a transmission manager 745.

The uplink data priority identifier 735 may be used to identify a priority parameter associated with data to be transmitted on an uplink carrier. In some examples, the data may be temporarily stored in one of a plurality of buffers (e.g., in a first buffer that temporarily stores buffered data to be transmitted on an uplink carrier in the shared radio frequency spectrum band or the dedicated radio frequency spectrum band, or in a second buffer that temporarily stores buffered data to be transmitted on an uplink carrier in the dedicated radio frequency spectrum band). In some examples, the priority parameter may include at least one of a QoS parameter, a first indication of whether the data comprises MAC layer control information, a second indication of whether the data comprises upper layer control information, a third indication that the data comprises a TCP ACK, a fourth indication that the data is for a high priority logical channel, or a fifth indication that the data is for an upper layer retransmission.

The message type selector 740 may include a BSR parameter selector 750. The BSR parameter selector 750 may be used to select, based at least in part on the identified priority parameter, between a first type of indication of buffered data to be transmitted on an uplink carrier in the shared radio frequency spectrum band or the dedicated radio frequency spectrum band, or a second type of indication of buffered data to be transmitted on an uplink carrier in the dedicated radio frequency spectrum band.

The transmission manager 745 may include a BSR transmission manager 755. In some examples, the BSR transmission manager 755 may be used to transmit the first type of indication or the second type of indication in a first BSR. In some examples, the first BSR may be transmitted in the dedicated radio frequency spectrum band. In some examples, the first type of indication or the second type of indication may be represented by a state or value of a field (and sometimes a state of a single bit (e.g., a logic "1" or a logic "0")) of the first BSR. In other examples, the BSR transmission manager 755 may be used to transmit the first type of indication in a second BSR or transmit the second type of indication in a third BSR. In some examples, the second BSR or the third BSR may be transmitted in the dedicated radio frequency spectrum band.

In some examples of the apparatus 715, the data to be transmitted on the uplink carrier may be associated with a logical channel group, and the first type of indication or the second type of indication may be selected (e.g., by the BSR parameter selector 750) and transmitted (e.g., by the BSR transmission manager 755) for the logical channel group. In some examples, an instance of the first type of indication or second type of indication may be transmitted for each of a plurality of logical channel groups associated with data to be transmitted on an uplink carrier, with the first type of indication or second type of indication being selected for each of the logical channel groups and being transmitted using the same BSR (or same set of BSRs).

In some examples, the wireless communication manager 720 may include a reclassification manager 760. The reclassification manager 760 may be used to reclassify the data to be transmitted on an uplink carrier upon expiration of a timer. For example, upon expiration of the timer, buffered data to be transmitted on an uplink carrier in the shared radio frequency spectrum band or the dedicated radio frequency spectrum band may be reclassified as buffered data to be transmitted on an uplink carrier in the dedicated radio frequency spectrum band (e.g., moved from the first buffer to the second buffer), or buffered data to be transmitted on an uplink carrier in the dedicated radio frequency spectrum band may be reclassified as buffered data to be transmitted on an uplink carrier in the shared radio frequency spectrum band or the dedicated radio frequency spectrum band (e.g., moved from the second buffer to the first buffer). Reclassifying data may enable data to be transmitted when there is congestion on a set of one or more uplink carriers in the shared radio frequency spectrum band or the dedicated radio frequency spectrum band (or in the case of one or more uplink carriers in the shared radio frequency spectrum band, an unavailability of one or more uplink carriers as a result of losing contention for access to the shared radio frequency spectrum band).

Figure 8:
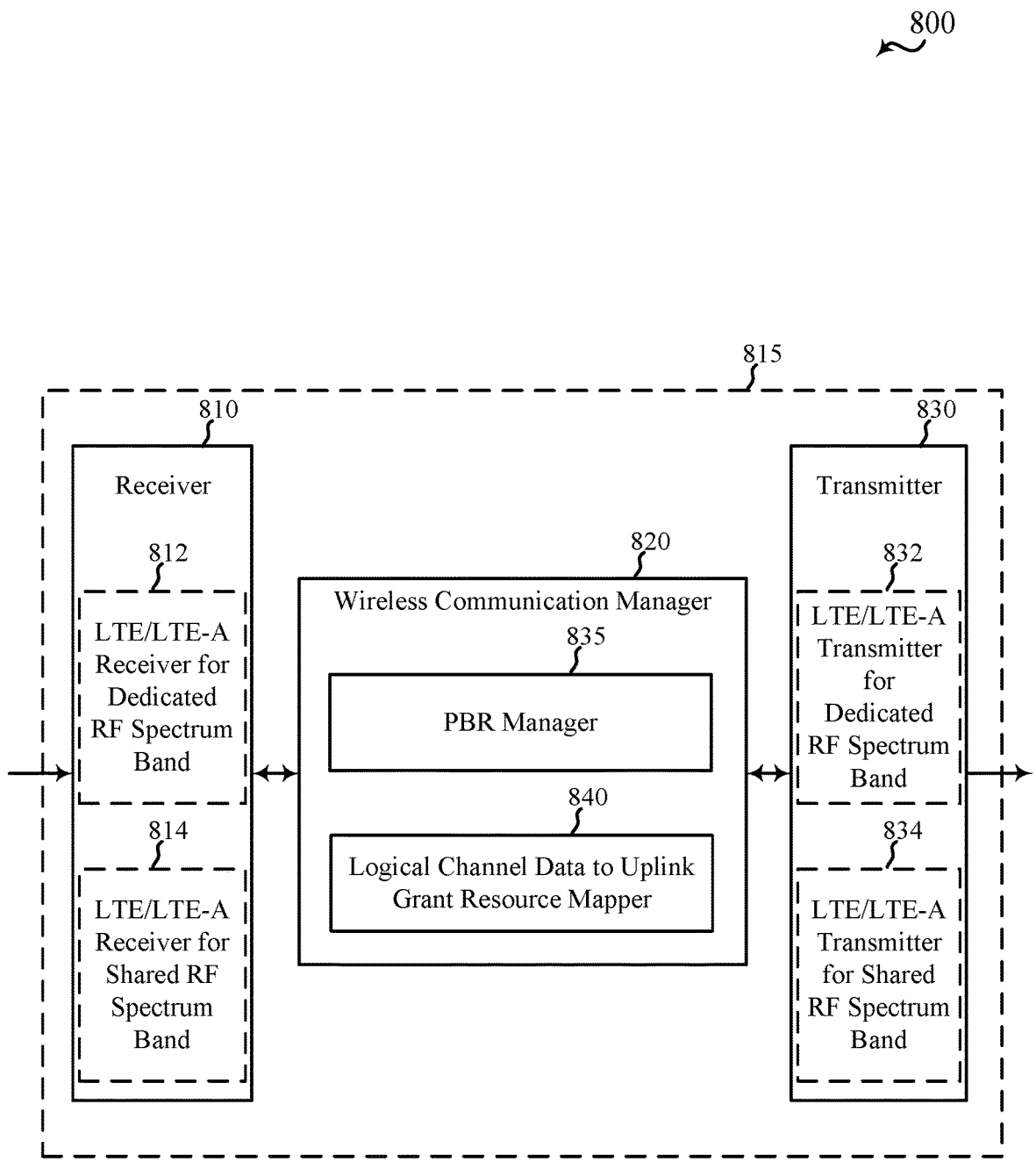
FIG. 8 shows a block diagram of an apparatus for use in wireless communication, in accordance with various aspects of the present disclosure.

FIG. 8 shows a block diagram 800 of an apparatus 815 for use in wireless communication, in accordance with various aspects of the present disclosure. The apparatus 815 may be an example of aspects of one or more of the UEs 115, 215, 315, or 415 described with reference to FIG. 1, 2, 3, or 4. The apparatus 815 may also be or include a processor. The apparatus 815 may include a receiver 810, a wireless communication manager 820, or a transmitter 830. Each of these components may be in communication with each other.

The components of the apparatus 815 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, or 4. The receiver 810 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 812), and an LTE/LTE-A receiver for communicating over the shared radio frequency spectrum band (e.g., LTE/LTE-A receiver for shared RF spectrum band 814). The receiver 810, including the LTE/LTE-A receiver for dedicated RF spectrum band 812 or the LTE/LTE-A receiver for shared RF spectrum band 814, may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 830 may include at least one RF transmitter, such as at least one RF transmitter operable to transmit over the dedicated radio frequency spectrum band or the shared radio frequency spectrum band. The transmitter 830 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 832), and an LTE/LTE-A transmitter for communicating over the shared radio frequency spectrum band (e.g., LTE/LTE-A transmitter for shared RF spectrum band 834). The transmitter 830, including the LTE/LTE-A transmitter for dedicated RF spectrum band 832 or the LTE/LTE-A transmitter for shared RF spectrum band 834, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 820 may be used to manage one or more aspects of wireless communication for the apparatus 815. In some examples, part of the wireless communication manager 820 may be incorporated into or shared with the receiver 810 or the transmitter 830. In some examples, the wireless communication manager 820 may include a PBR manager 835 or a logical channel data to uplink grant resource mapper 840.

The PBR manager 835 may be used to maintain a first PBR and a second PBR for each of one or more logical channels. The first PBR may be associated with transmissions in the shared radio frequency spectrum band or the dedicated radio frequency spectrum band, and the second PBR may be associated with transmissions in the dedicated radio frequency spectrum band. The logical channel data to uplink grant resource mapper 840 may be used to map at least a portion of data associated with a logical channel of the one or more logical channels to resources of one or more uplink grants according to the first PBR for the logical channel and the second PBR for the logical channel.

Figure 9:
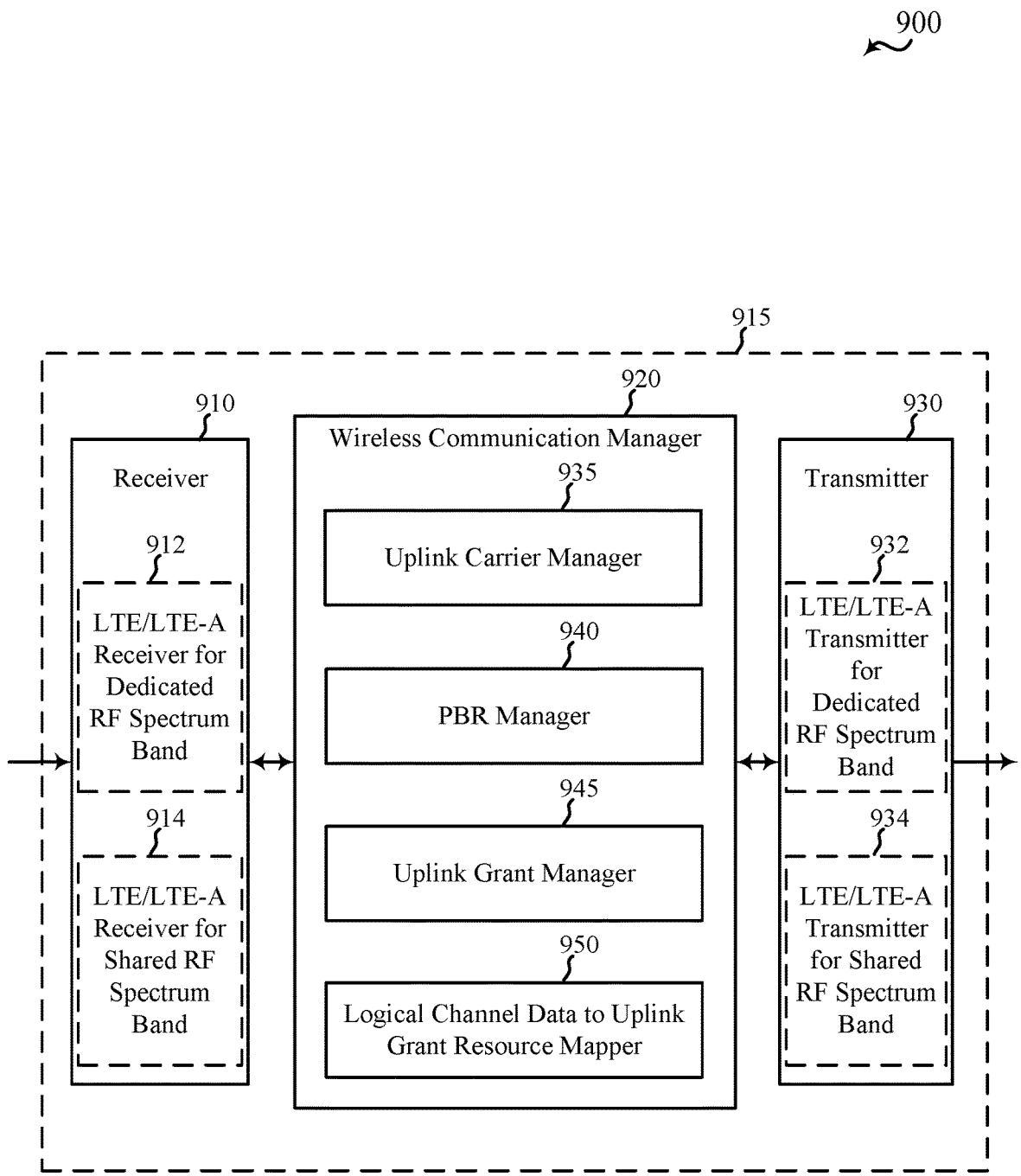
FIG. 9 shows a block diagram of an apparatus for use in wireless communication, in accordance with various aspects of the present disclosure.

FIG. 9 shows a block diagram 900 of an apparatus 915 for use in wireless communication, in accordance with various aspects of the present disclosure. The apparatus 915 may be an example of aspects of one or more of the UEs 115, 215, 315, or 415 described with reference to FIG. 1, 2, 3, or 4, or aspects of the apparatus 515 described with reference to FIG. 5. The apparatus 915 may also be or include a processor. The apparatus 915 may include a receiver 910, a wireless communication manager 920, or a transmitter 930. Each of these components may be in communication with each other.

The components of the apparatus 915 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, or 4. The receiver 910 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 912), and an LTE/LTE-A receiver for communicating over the shared radio frequency spectrum band (e.g., LTE/LTE-A receiver for shared RF spectrum band 914). The receiver 910, including the LTE/LTE-A receiver for dedicated RF spectrum band 912 or the LTE/LTE-A receiver for shared RF spectrum band 914, may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 930 may include at least one RF transmitter, such as at least one RF transmitter operable to transmit over the dedicated radio frequency spectrum band or the shared radio frequency spectrum band. The transmitter 930 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 932), and an LTE/LTE-A transmitter for communicating over the shared radio frequency spectrum band (e.g., LTE/LTE-A transmitter for shared RF spectrum band 934). The transmitter 930, including the LTE/LTE-A transmitter for dedicated RF spectrum band 932 or the LTE/LTE-A transmitter for shared RF spectrum band 934, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 920 may be used to manage one or more aspects of wireless communication for the apparatus 915. In some examples, part of the wireless communication manager 920 may be incorporated into or shared with the receiver 910 or the transmitter 930. In some examples, the wireless communication manager 920 may include an uplink carrier manager 935, a PBR manager 940, an uplink grant manager 945, or a logical channel data to uplink grant resource mapper 950.

The uplink carrier manager 935 may be used to communicate on a first uplink carrier in the dedicated radio frequency spectrum band and a second uplink carrier in the shared radio frequency spectrum band. The PBR manager 940 may be used to maintain a PBR (e.g., a single PBR for transmissions in the shared radio frequency spectrum band and the dedicated radio frequency spectrum band) for each of a plurality of logical channels to determine a nominal scheduling priority of the plurality of logical channels. The uplink grant manager 945 may be used to receive an uplink grant for the first uplink carrier in the dedicated radio frequency spectrum band. The logical channel data to uplink grant resource mapper 950 may be used to map at least a portion of data associated with a logical channel of the plurality of logical channels to resources of the uplink grant according to a logical channel priority applied independently of the nominal scheduling priority. In some examples, the at least portion of the data associated with the logical channel may include at least one of an upper layer retransmission, upper layer control information, or a TCP ACK.

Figure 10:
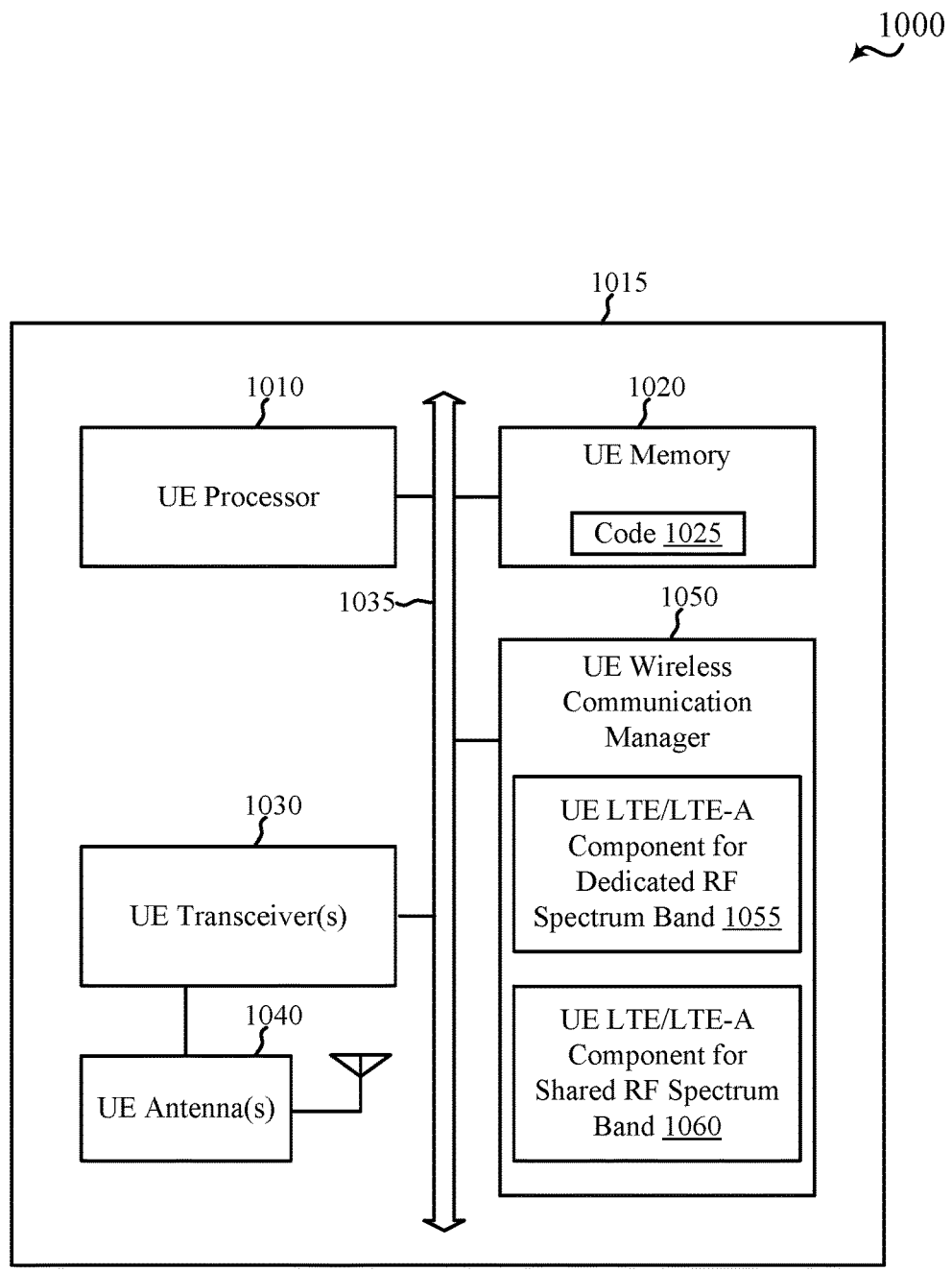
FIG. 10 shows a block diagram of a UE for use in wireless communication, in accordance with various aspects of the present disclosure.

FIG. 10 shows a block diagram 1000 of a UE 1015 for use in wireless communication, in accordance with various aspects of the present disclosure. The UE 1015 may be included or be part of a personal computer (e.g., a laptop computer, a netbook computer, a tablet computer, etc.), a cellular telephone, a PDA, a DVR, an internet appliance, a gaming console, an e-reader, etc. The UE 1015 may, in some examples, have an internal power supply (not shown), such as a small battery, to facilitate mobile operation. In some examples, the UE 1015 may be an example of aspects of one or more of the UEs 115, 215, 315, or 415 described with reference to FIG. 1, 2, 3, or 4, or aspects of one or more of the apparatuses 515, 615, 715, 815, or 915 described with reference to FIG. 5, 6, 7, 8, or 9. The UE 1015 may be configured to implement at least some of the UE or apparatus techniques and functions described with reference to FIG. 1, 2, 3, 4, 5, 6, 7, 8, or 9.

The UE 1015 may include a UE processor 1010, a UE memory 1020, at least one UE transceiver (represented by UE transceiver(s) 1030), at least one UE antenna (represented by UE antenna(s) 1040), or a UE wireless communication manager 1050. Each of these components may be in communication with each other, directly or indirectly, over one or more buses 1035.

The UE memory 1020 may include random access memory (RAM) or read-only memory (ROM). The UE memory 1020 may store computer-readable, computer-executable code 1025 containing instructions that are configured to, when executed, cause the UE processor 1010 to perform various functions described herein related to wireless communication, including, for example, transmitting different types of scheduling requests or buffer status reports, or mapping data associated with a logical channel to resources of one or more uplink grants. Alternatively, the computer-executable code 1025 may not be directly executable by the UE processor 1010 but be configured to cause the UE 1015 (e.g., when compiled and executed) to perform various of the functions described herein.

The UE processor 1010 may include an intelligent hardware device, e.g., a central processing unit (CPU), a microcontroller, an ASIC, etc. The UE processor 1010 may process information received through the UE transceiver(s) 1030 or information to be sent to the UE transceiver(s) 1030 for transmission through the UE antenna(s) 1040. The UE processor 1010 may handle, alone or in connection with the UE wireless communication manager 1050, various aspects of communicating over (or managing communications over) a dedicated radio frequency spectrum band or the shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

The UE transceiver(s) 1030 may include a modem configured to modulate packets and provide the modulated packets to the UE antenna(s) 1040 for transmission, and to demodulate packets received from the UE antenna(s) 1040. The UE transceiver(s) 1030 may, in some examples, be implemented as one or more UE transmitters and one or more separate UE receivers. The UE transceiver(s) 1030 may support communications in the dedicated radio frequency spectrum band or the shared radio frequency spectrum band. The UE transceiver(s) 1030 may be configured to communicate bi-directionally, via the UE antenna(s) 1040, with one or more of the base stations 105, 205, 305, or 405 described with reference to FIG. 1, 2, 3, or 4. While the UE 1015 may include a single UE antenna, there may be examples in which the UE 1015 may include multiple UE antennas 1040.

The UE wireless communication manager 1050 may be configured to perform or control some or all of the UE or apparatus techniques or functions described with reference to FIG. 1, 2, 3, 4, 5, 6, 7, 8, or 9 related to wireless communication over the dedicated radio frequency spectrum band or the shared radio frequency spectrum band. For example, the UE wireless communication manager 1050 may be configured to support a supplemental downlink mode (e.g., a licensed assisted access mode), a carrier aggregation mode, or a standalone mode using the dedicated radio frequency spectrum band or the shared radio frequency spectrum band. The UE wireless communication manager 1050 may include a UE LTE/LTE-A component for dedicated RF spectrum band 1055 configured to handle LTE/LTE-A communications in the dedicated radio frequency spectrum band, and a UE LTE/LTE-A component for shared RF spectrum band 1060 configured to handle LTE/LTE-A communications in the shared radio frequency spectrum band. The UE wireless communication manager 1050, or portions of it, may include a processor, or some or all of the functions of the UE wireless communication manager 1050 may be performed by the UE processor 1010 or in connection with the UE processor 1010. In some examples, the UE wireless communication manager 1050 may be an example of the wireless communication manager 520, 620, 720, 820, or 920 described with reference to FIG. 5, 6, 7, 8, or 9.

Figure 11:
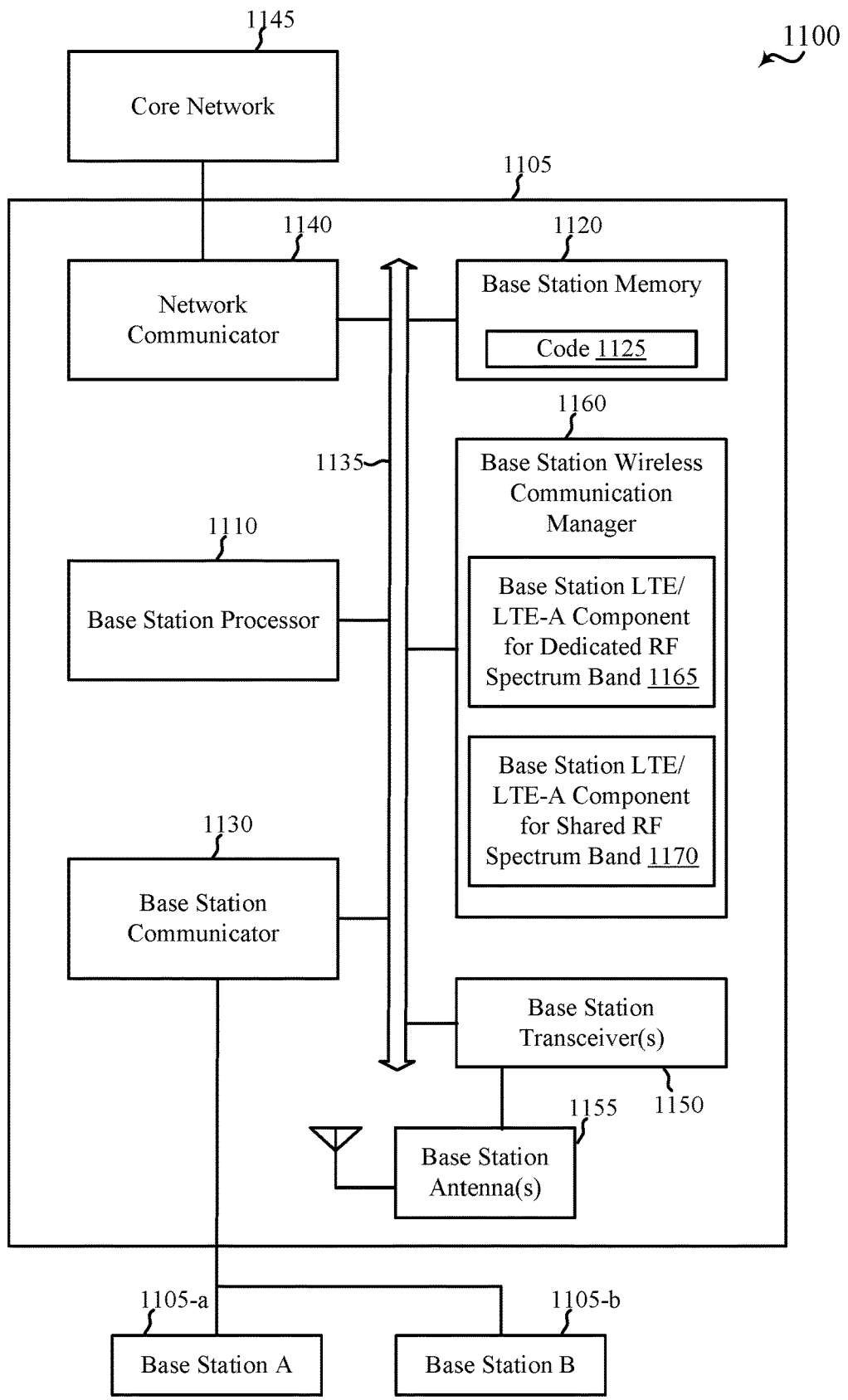
FIG. 11 shows a block diagram of a base station (e.g., a base station forming part or all of an eNB) for use in wireless communication, in accordance with various aspects of the present disclosure.

FIG. 11 shows a block diagram 1100 of a base station 1105 (e.g., a base station forming part or all of an eNB) for use in wireless communication, in accordance with various aspects of the present disclosure. In some examples, the base station 1105 may be an example of one or more aspects of the base stations 105, 205, 305, or 405 described with reference to FIG. 1, 2, 3, or 4. The base station 1105 may be configured to implement or facilitate at least some of the base station techniques and functions described with reference to FIG. 1, 2, 3, or 4.

The base station 1105 may include a base station processor 1110, a base station memory 1120, at least one base station transceiver (represented by base station transceiver(s) 1150), at least one base station antenna (represented by base station antenna(s) 1155), or a base station wireless communication manager 1160. The base station 1105 may also include one or more of a base station communicator 1130 or a network communicator 1140. Each of these components may be in communication with each other, directly or indirectly, over one or more buses 1135.

The base station memory 1120 may include RAM or ROM. The base station memory 1120 may store computer-readable, computer-executable code 1125 containing instructions that are configured to, when executed, cause the base station processor 1110 to perform various functions described herein related to wireless communication, including, for example, receiving different types of scheduling requests or buffer status reports from UEs, and transmitting a first type of uplink grant for uplink transmissions on one or more uplink carriers in a shared radio frequency spectrum band or a dedicated radio frequency spectrum band, or a second type of uplink grant for uplink transmissions on one or more uplink carriers in the dedicated radio frequency spectrum band. Alternatively, the computer-executable code 1125 may not be directly executable by the base station processor 1110 but be configured to cause the base station 1105 (e.g., when compiled and executed) to perform various of the functions described herein.

The base station processor 1110 may include an intelligent hardware device, e.g., a CPU, a microcontroller, an ASIC, etc. The base station processor 1110 may process information received through the base station transceiver(s) 1150, the base station communicator 1130, or the network communicator 1140. The base station processor 1110 may also process information to be sent to the transceiver(s) 1150 for transmission through the antenna(s) 1155, to the base station communicator 1130, for transmission to one or more other base stations (e.g., base station 1105-a and base station 1105-b), or to the network communicator 1140 for transmission to a core network 1145, which may be an example of one or more aspects of the core network 130 described with reference to FIG. 1. The base station processor 1110 may handle, alone or in connection with the base station wireless communication manager 1160, various aspects of communicating over (or managing communications over) the dedicated radio frequency spectrum band or the shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

The base station transceiver(s) 1150 may include a modem configured to modulate packets and provide the modulated packets to the base station antenna(s) 1155 for transmission, and to demodulate packets received from the base station antenna(s) 1155. The base station transceiver(s) 1150 may, in some examples, be implemented as one or more base station transmitters and one or more separate base station receivers. The base station transceiver(s) 1150 may support communications in the dedicated radio frequency spectrum band or the shared radio frequency spectrum band. The base station transceiver(s) 1150 may be configured to communicate bi-directionally, via the antenna(s) 1155, with one or more UEs or apparatuses, such as one or more of the UEs 115, 215, 315, 415, or 1015 described with reference to FIG. 1, 2, 3, 4, or 10, or one or more of the apparatuses 515, 615, 715, 815, or 915 described with reference to FIG. 5, 6, 7, 8, or 9. The base station 1105 may, for example, include multiple base station antennas 1155 (e.g., an antenna array). The base station 1105 may communicate with the core network 1145 through the network communicator 1140. The base station 1105 may also communicate with other base stations, such as the base station 1105-a and the base station 1105-b, using the base station communicator 1130.

The base station wireless communication manager 1160 may be configured to perform or control some or all of the techniques or functions described with reference to FIG. 1, 2, 3, or 4 related to wireless communication over the dedicated radio frequency spectrum band or the shared radio frequency spectrum band. For example, the base station wireless communication manager 1160 may be configured to support a supplemental downlink mode (e.g., a licensed assisted access mode), a carrier aggregation mode, or a standalone mode using the dedicated radio frequency spectrum band or the shared radio frequency spectrum band. The base station wireless communication manager 1160 may include a base station LTE/LTE-A component for dedicated RF spectrum band 1165 configured to handle LTE/LTE-A communications in the dedicated radio frequency spectrum band, and a base station LTE/LTE-A component for shared RF spectrum band 1170 configured to handle LTE/LTE-A communications in the shared radio frequency spectrum band. The base station wireless communication manager 1160, or portions of it, may include a processor, or some or all of the functions of the base station wireless communication manager 1160 may be performed by the base station processor 1110 or in connection with the base station processor 1110.

Figure 12:
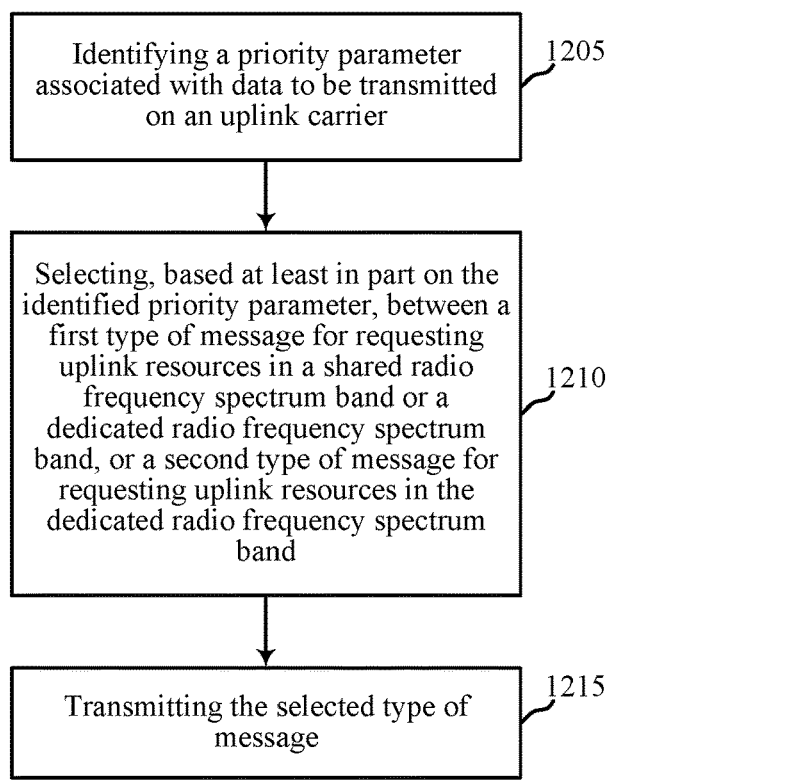
FIG. 12 is a flow chart illustrating an example of a method for wireless communication at a UE, in accordance with various aspects of the present disclosure.

FIG. 12 is a flow chart illustrating an example of a method 1200 for wireless communication at a UE, in accordance with various aspects of the present disclosure. For clarity, the method 1200 is described below with reference to aspects of one or more of the UEs 115, 215, 315, 415, or 1015 described with reference to FIG. 1, 2, 3, 4, or 10, or aspects of one or more of the apparatuses 515, 615, 715, 815, or 915 described with reference to FIG. 5, 6, 7, 8, or 9. In some examples, a UE may execute one or more sets of codes to control the functional elements of the UE to perform the functions described below. Additionally or alternatively, the UE may perform one or more of the functions described below using special-purpose hardware.

At block 1205, the method 1200 may include identifying a priority parameter associated with data to be transmitted on an uplink carrier. In some examples, the priority parameter may include at least one of a QoS parameter, a first indication of whether the data comprises MAC layer control information, a second indication of whether the data comprises upper layer control information, a third indication that the data comprises a TCP ACK, a fourth indication that the data is for a high priority logical channel, or a fifth indication that the data is for an upper layer retransmission. The operation(s) at block 1205 may be performed using the wireless communication manager 520, 620, 720, 820, or 920 or UE wireless communication manager 1050 described with reference to FIG. 5, 6, 7, 8, 9, or 10, or the uplink data priority identifier 535, 635, or 735 described with reference to FIG. 5, 6, or 7.

At block 1210, the method 1200 may include selecting, based at least in part on the identified priority parameter, between a first type of message for requesting uplink resources in a shared radio frequency spectrum band or a dedicated radio frequency spectrum band, or a second type of message may for requesting uplink resources in the dedicated radio frequency spectrum band. In some examples, the first type of message may include a first type of scheduling request for uplink resources in the shared radio frequency spectrum band or the dedicated radio frequency spectrum band, and the second type of message may include a second type of scheduling request for uplink resources in the dedicated radio frequency spectrum band. In some examples, the first type of message may include a first type of indication of buffered data to be transmitted on an uplink carrier in the shared radio frequency spectrum band or the dedicated radio frequency spectrum band, and the second type of message may include a second type of indication of buffered data to be transmitted on an uplink carrier in the dedicated radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The operation(s) at block 1210 may be performed using the wireless communication manager 520, 620, 720, 820, or 920 or UE wireless communication manager 1050 described with reference to FIG. 5, 6, 7, 8, 9, or 10, or the message type selector 540, 640, or 740 described with reference to FIG. 5, 6, or 7.

At block 1215, the method 1200 may include transmitting the selected type of message (e.g., to a base station). The operation(s) at block 1215 may be performed using the wireless communication manager 520, 620, 720, 820, or 920 or UE wireless communication manager 1050 described with reference to FIG. 5, 6, 7, 8, 9, or 10, or the transmission manager 545, 645, or 745 described with reference to FIG. 5, 6, or 7.

Thus, the method 1200 may provide for wireless communication. It should be noted that the method 1200 is just one implementation and that the operations of the method 1200 may be rearranged or otherwise modified such that other implementations are possible.

Figure 13:
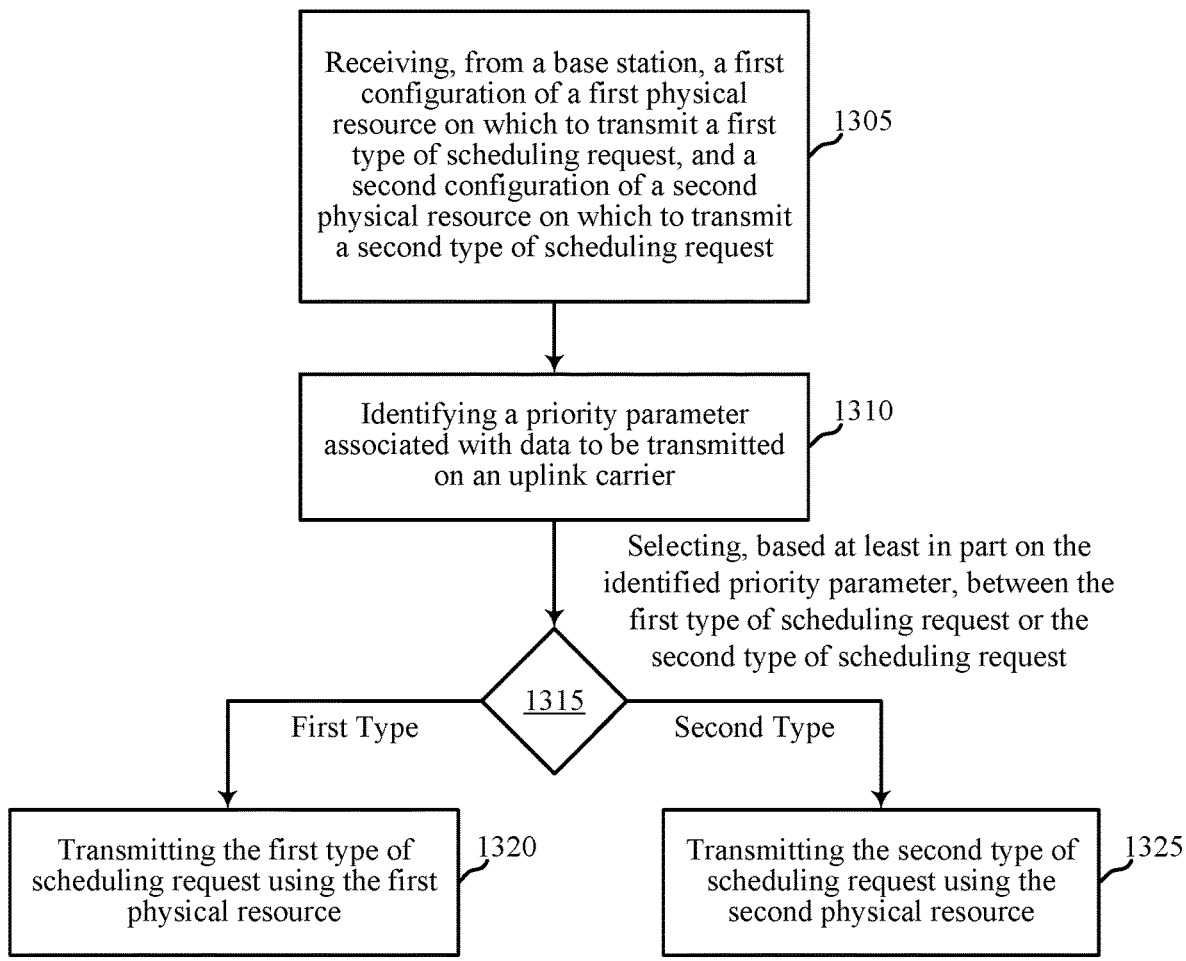
FIG. 13 is a flow chart illustrating an example of a method for wireless communication at a UE, in accordance with various aspects of the present disclosure.

FIG. 13 is a flow chart illustrating an example of a method 1300 for wireless communication at a UE, in accordance with various aspects of the present disclosure. For clarity, the method 1300 is described below with reference to aspects of one or more of the UEs 115, 215, 315, 415, or 1015 described with reference to FIG. 1, 2, 3, 4, or 10, or aspects of one or more of the apparatuses 515, 615, 715, 815, or 915 described with reference to FIG. 5, 6, 7, 8, or 9. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include receiving, from a base station, a first configuration of a first physical resource on which to transmit the first type of scheduling request, and a second configuration of a second physical resource on which to transmit the second type of scheduling request. The first type of scheduling request may be for uplink resources in the shared radio frequency spectrum band or the dedicated radio frequency spectrum band, and the second type of scheduling request may be for uplink resources in the dedicated radio frequency spectrum band. In some examples, the first physical resource may be in the shared radio frequency spectrum band and the second physical resource may be in the dedicated radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). In some examples, the first physical resource and the second physical resource may include distinct time resources, frequency resources, and code resources of a physical uplink control channel (PUCCH). The operation(s) at block 1305 may be performed using the wireless communication manager 520, 620, 720, 820, or 920 or UE wireless communication manager 1050 described with reference to FIG. 5, 6, 7, 8, 9, or 10, or the resource manager 650 described with reference to FIG. 6.

At block 1310, the method 1300 may include identifying a priority parameter associated with data to be transmitted on an uplink carrier. In some examples, the priority parameter may include at least one of a QoS parameter, a first indication of whether the data comprises MAC layer control information, a second indication of whether the data comprises upper layer control information, a third indication that the data comprises a TCP ACK, a fourth indication that the data is for a high priority logical channel, or a fifth indication that the data is for an upper layer retransmission. The operation(s) at block 1310 may be performed using the wireless communication manager 520, 620, 720, 820, or 920 or UE wireless communication manager 1050 described with reference to FIG. 5, 6, 7, 8, 9, or 10, or the uplink data priority identifier 535, 635, or 735 described with reference to FIG. 5, 6, or 7.

At block 1315, the method 1300 may include selecting, based at least in part on the identified priority parameter, between the first type of scheduling request or the second type of scheduling request. When the first type of scheduling request is selected, the method 1300 may continue at block 1320. When the second type of scheduling request is selected, the method 1300 may continue at block 1325. The operation(s) at block 1315 may be performed using the wireless communication manager 520, 620, 720, 820, or 920 or UE wireless communication manager 1050 described with reference to FIG. 10, the message type selector 540, 640, or 740 described with reference to FIG. 5, 6, or 7, or the SR type selector 655 described with reference to FIG. 6.

At block 1320, the method 1300 may include transmitting the first type of scheduling request (e.g., to a base station) using the first physical resource. At block 1325, the method 1300 may include transmitting the second type of scheduling request (e.g., to a base station) using the second physical resource. The operation(s) at block 1320 or 1325 may be performed using the wireless communication manager 520, 620, 720, 820, or 920 or UE wireless communication manager 1050 described with reference to FIG. 5, 6, 7, 8, 9, or 10, the transmission manager 545, 645, or 745 described with reference to FIG. 5, 6, or 7, or the SR transmission manager 660 described with reference to FIG. 6.

Thus, the method 1300 may provide for wireless communication. It should be noted that the method 1300 is just one implementation and that the operations of the method 1300 may be rearranged or otherwise modified such that other implementations are possible.

Figure 14:
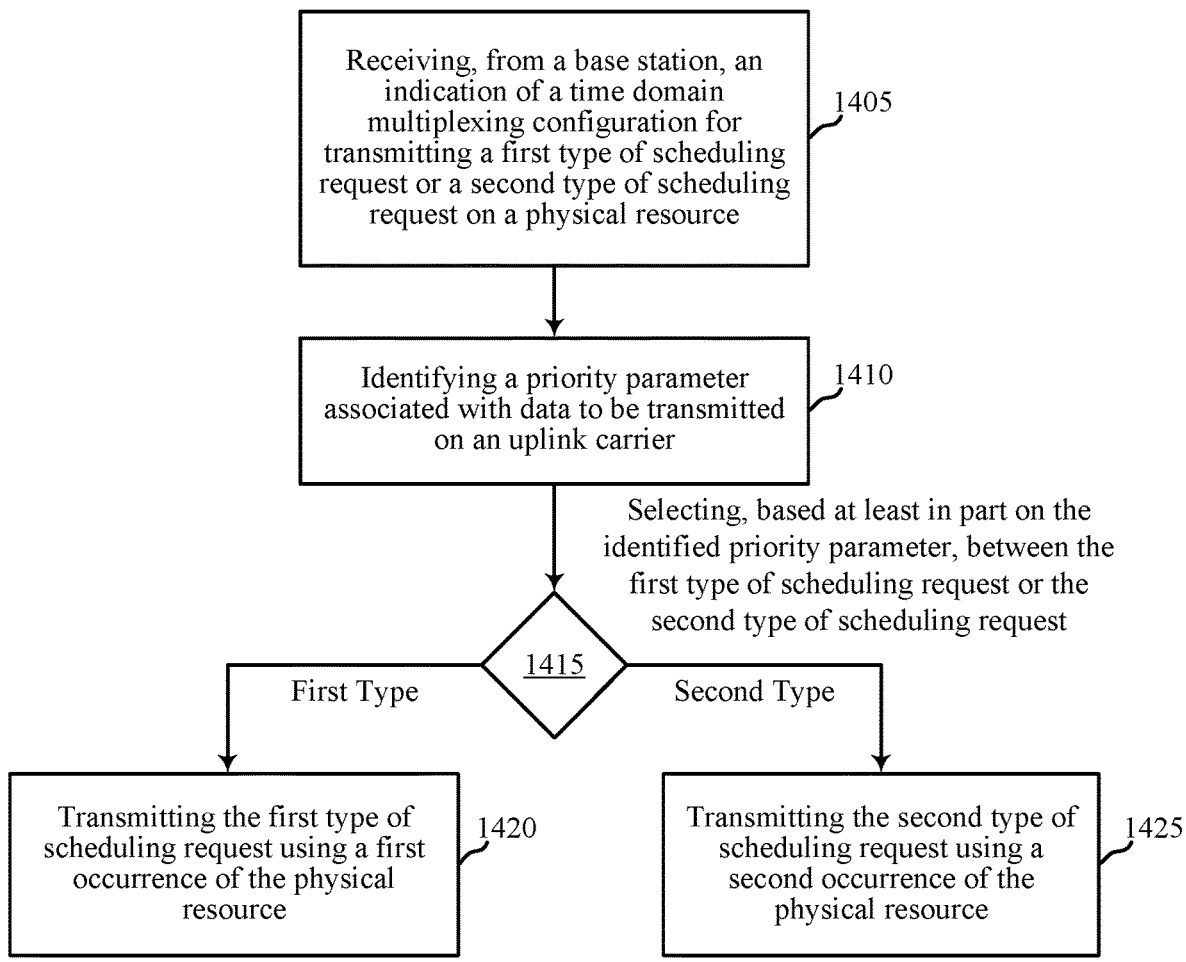
FIG. 14 is a flow chart illustrating an example of a method for wireless communication at a UE, in accordance with various aspects of the present disclosure.

FIG. 14 is a flow chart illustrating an example of a method 1400 for wireless communication at a UE, in accordance with various aspects of the present disclosure. For clarity, the method 1400 is described below with reference to aspects of one or more of the UEs 115, 215, 315, 415, or 1015 described with reference to FIG. 1, 2, 3, 4, or 10, or aspects of one or more of the apparatuses 515, 615, 715, 815, or 915 described with reference to FIG. 5, 6, 7, 8, or 9. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include receiving, from a base station, an indication of a time domain multiplexing configuration for transmitting a first type of scheduling request or a second type of scheduling request on a physical resource. The first type of scheduling request may be for uplink resources in a shared radio frequency spectrum band or a dedicated radio frequency spectrum band, and the second type of scheduling request may be for uplink resources in the dedicated radio frequency spectrum band. In some examples, the physical resource may be in the dedicated radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The operation(s) at block 1405 may be performed using the wireless communication manager 520, 620, 720, 820, or 920 or UE wireless communication manager 1050 described with reference to FIG. 5, 6, 7, 8, 9, or 10, or the resource manager 650 described with reference to FIG. 6.

At block 1410, the method 1400 may include identifying a priority parameter associated with data to be transmitted on an uplink carrier. In some examples, the priority parameter may include at least one of a QoS parameter, a first indication of whether the data comprises MAC layer control information, a second indication of whether the data comprises upper layer control information, a third indication that the data comprises a TCP ACK, a fourth indication that the data is for a high priority logical channel, or a fifth indication that the data is for an upper layer retransmission. The operation(s) at block 1410 may be performed using the wireless communication manager 520, 620, 720, 820, or 920 or UE wireless communication manager 1050 described with reference to FIG. 5, 6, 7, 8, 9, or 10, or the uplink data priority identifier 535, 635, or 735 described with reference to FIG. 5, 6, or 7.

At block 1415, the method 1400 may include selecting, based at least in part on the identified priority parameter, between the first type of scheduling request or the second type of scheduling request. When the first type of scheduling request is selected, the method 1400 may continue at block 1420. When the second type of scheduling request is selected, the method 1400 may continue at block 1425. The operation(s) at block 1415 may be performed using the wireless communication manager 520, 620, 720, 820, or 920 or UE wireless communication manager 1050 described with reference to FIG. 10, the message type selector 540, 640, or 740 described with reference to FIG. 5, 6, or 7, or the SR type selector 655 described with reference to FIG. 6.

At block 1420 or 1425, the method 1400 may include transmitting the first type of scheduling request or the second type of scheduling request (e.g., to a base station) using the physical resource. At block 1420, the first type of scheduling request may be transmitted using a first occurrence of the physical resource, in accordance with the time domain multiplexing configuration of the physical resource. At block 1425, the second type of scheduling request may be transmitted using a second occurrence of the physical resource, in accordance with the time domain multiplexing configuration of the physical resource. The operation(s) at block 1420 or 1425 may be performed using the wireless communication manager 520, 620, 720, 820, or 920 or UE wireless communication manager 1050 described with reference to FIG. 5, 6, 7, 8, 9, or 10, the transmission manager 545, 645, or 745 described with reference to FIG. 5, 6, or 7, or the SR transmission manager 660 described with reference to FIG. 6.

Thus, the method 1400 may provide for wireless communication. It should be noted that the method 1400 is just one implementation and that the operations of the method 1400 may be rearranged or otherwise modified such that other implementations are possible.

Figure 15:
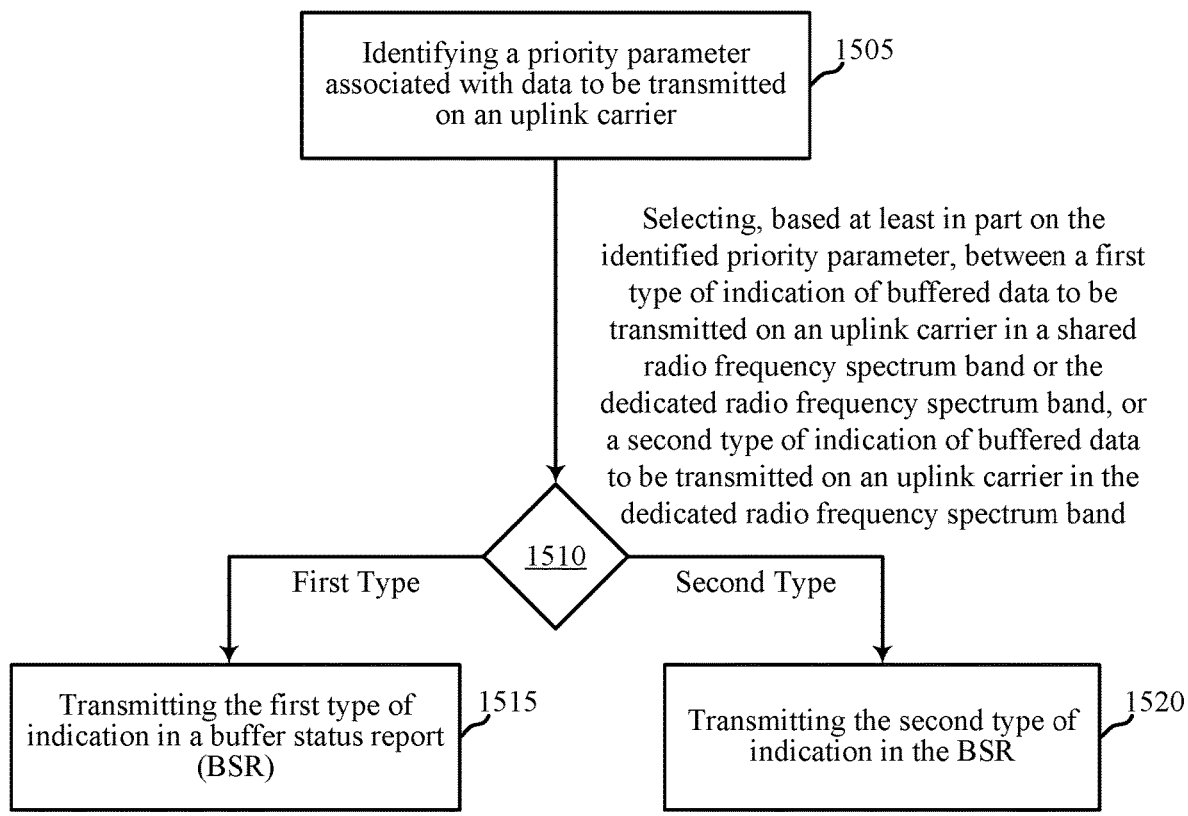
FIG. 15 is a flow chart illustrating an example of a method for wireless communication at a UE, in accordance with various aspects of the present disclosure.

FIG. 15 is a flow chart illustrating an example of a method 1500 for wireless communication at a UE, in accordance with various aspects of the present disclosure. For clarity, the method 1500 is described below with reference to aspects of one or more of the UEs 115, 215, 315, 415, or 1015 described with reference to FIG. 1, 2, 3, 4, or 10, or aspects of one or more of the apparatuses 515, 615, 715, 815, or 915 described with reference to FIG. 5, 6, 7, 8, or 9. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include identifying a priority parameter associated with data to be transmitted on an uplink carrier. In some examples, the data may be temporarily stored in one of a plurality of buffers (e.g., in a first buffer that temporarily stores buffered data to be transmitted on an uplink carrier in a shared radio frequency spectrum band or a dedicated radio frequency spectrum band, or in a second buffer that temporarily stores buffered data to be transmitted on an uplink carrier in the dedicated radio frequency spectrum band). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). In some examples, the priority parameter may include at least one of a QoS parameter, a first indication of whether the data comprises MAC layer control information, a second indication of whether the data comprises upper layer control information, a third indication that the data comprises a TCP ACK, a fourth indication that the data is for a high priority logical channel, or a fifth indication that the data is for an upper layer retransmission. The operation(s) at block 1505 may be performed using the wireless communication manager 520, 620, 720, 820, or 920 or UE wireless communication manager 1050 described with reference to FIG. 5, 6, 7, 8, 9, or 10, or the uplink data priority identifier 535, 635, or 735 described with reference to FIG. 5, 6, or 7.

At block 1510, the method 1500 may include selecting, based at least in part on the identified priority parameter, between a first type of indication of buffered data to be transmitted on an uplink carrier in the shared radio frequency spectrum band or the dedicated radio frequency spectrum band, or a second type of indication of buffered data to be transmitted on an uplink carrier in the dedicated radio frequency spectrum band. When the first type of indication is selected, the method 1500 may continue at block 1515. When the second type of indication is selected, the method 1500 may continue at block 1520. The operation(s) at block 1510 may be performed using the wireless communication manager 520, 620, 720, 820, or 920 or UE wireless communication manager 1050 described with reference to FIG. 5, 6, 7, 8, 9, or 10, the message type selector 540, 640, or 740 described with reference to FIG. 5, 6, or 7, or the BSR parameter selector 750 described with reference to FIG. 7.

At block 1515, the method 1500 may include transmitting the first type of indication (e.g., to a base station) in a BSR. At block 1520, the method 1500 may include transmitting the second type of indication (e.g., to a base station) in the BSR. In some examples, the first type of indication or the second type of indication may be represented by a state or value of a field (and sometimes a state of a single bit (e.g., a logic "1" or a logic "0")) of the first BSR. In some examples, the BSR may be transmitted in the dedicated radio frequency spectrum band. The operation(s) at block 1515 or 1520 may be performed using the wireless communication manager 520, 620, 720, 820, or 920 or UE wireless communication manager 1050 described with reference to FIG. 5, 6, 7, 8, 9, or 10, the transmission manager 545, 645, or 745 described with reference to FIG. 5, 6, or 7, or the BSR transmission manager 755 described with reference to FIG. 7.

In some examples of the method 1500, the data to be transmitted on the uplink carrier may be associated with a logical channel group, and the first type of indication or the second type of indication may be selected and transmitted for the logical channel group. In some examples, the method 1500 may be repeated for each of a plurality of logical channel groups associated with data to be transmitted on an uplink carrier, with the first type of indication or second type of indication being selected for each of the logical channel groups and being transmitted using the same BSR.

In some examples, the method 1500 may include reclassifying the data to be transmitted on the uplink carrier upon expiration of a timer. For example, upon expiration of the timer, buffered data to be transmitted on an uplink carrier in the shared radio frequency spectrum band or the dedicated radio frequency spectrum band may be reclassified as buffered data to be transmitted on an uplink carrier in the dedicated radio frequency spectrum band (e.g., moved from the first buffer to the second buffer), or buffered data to be transmitted on an uplink carrier in the dedicated radio frequency spectrum band may be reclassified as buffered data to be transmitted on an uplink carrier in the shared radio frequency spectrum band or the dedicated radio frequency spectrum band (e.g., moved from the second buffer to the first buffer). Reclassifying data may enable data to be transmitted when there is congestion on a set of one or more uplink carriers in the shared radio frequency spectrum band or the dedicated radio frequency spectrum band (or in the case of one or more uplink carriers in the shared radio frequency spectrum band, an unavailability of one or more uplink carriers as a result of losing contention for access to the shared radio frequency spectrum band).

Thus, the method 1500 may provide for wireless communication. It should be noted that the method 1500 is just one implementation and that the operations of the method 1500 may be rearranged or otherwise modified such that other implementations are possible.

Figure 16:
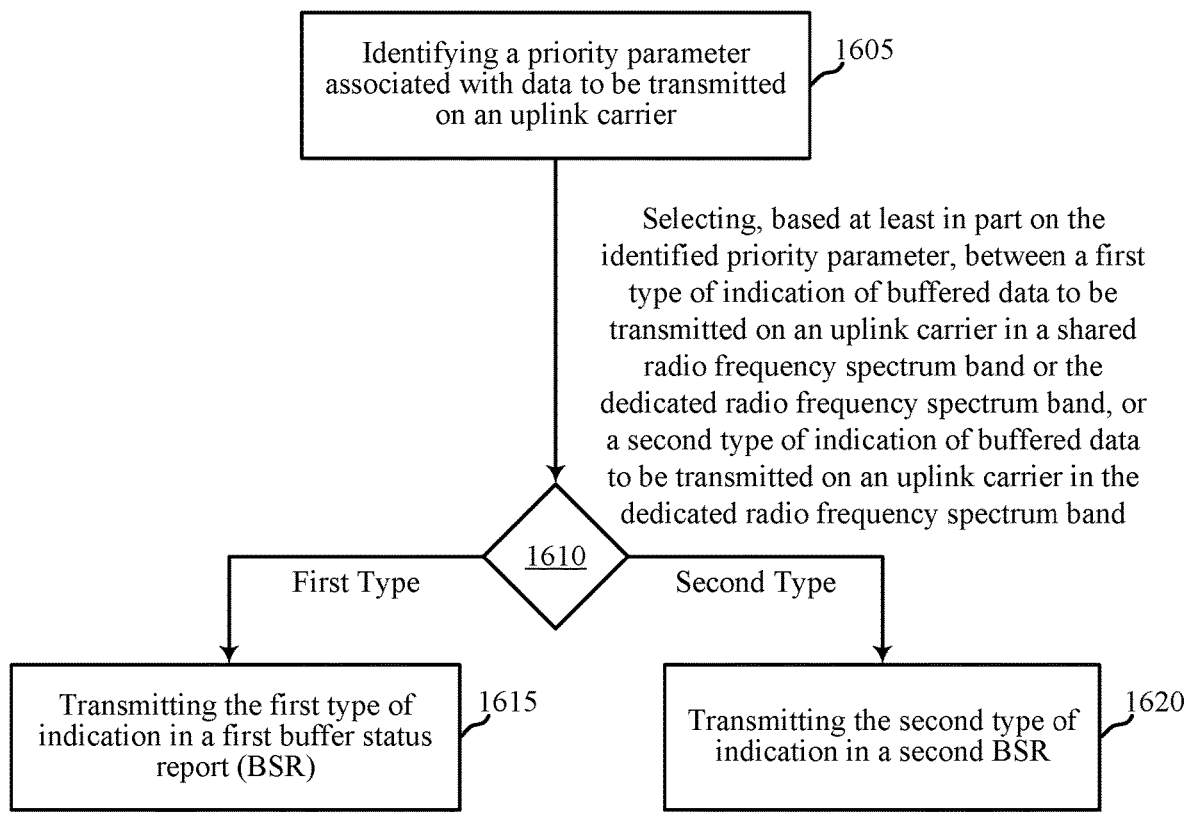
FIG. 16 is a flow chart illustrating an example of a method for wireless communication at a UE, in accordance with various aspects of the present disclosure.

FIG. 16 is a flow chart illustrating an example of a method 1600 for wireless communication at a UE, in accordance with various aspects of the present disclosure. For clarity, the method 1600 is described below with reference to aspects of one or more of the UEs 115, 215, 315, 415, or 1015 described with reference to FIG. 1, 2, 3, 4, or 10, or aspects of one or more of the apparatuses 515, 615, 715, 815, or 915 described with reference to FIG. 5, 6, 7, 8, or 9. In some examples, a UE may execute one or more sets of codes to control the functional elements of the UE to perform the functions described below. Additionally or alternatively, the UE may perform one or more of the functions described below using special-purpose hardware.

At block 1605, the method 1600 may include identifying a priority parameter associated with data to be transmitted on an uplink carrier. In some examples, the data may be temporarily stored in one of a plurality of buffers (e.g., in a first buffer that temporarily stores buffered data to be transmitted on an uplink carrier in a shared radio frequency spectrum band or a dedicated radio frequency spectrum band, or in a second buffer that temporarily stores buffered data to be transmitted on an uplink carrier in the dedicated radio frequency spectrum band). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). In some examples, the priority parameter may include at least one of a QoS parameter, a first indication of whether the data comprises MAC layer control information, a second indication of whether the data comprises upper layer control information, a third indication that the data comprises a TCP ACK, a fourth indication that the data is for a high priority logical channel, or a fifth indication that the data is for an upper layer retransmission. The operation(s) at block 1605 may be performed using the wireless communication manager 520, 620, 720, 820, or 920 or UE wireless communication manager 1050 described with reference to FIG. 5, 6, 7, 8, 9, or 10, or the uplink data priority identifier 535, 635, or 735 described with reference to FIG. 5, 6, or 7.

At block 1610, the method 1600 may include selecting, based at least in part on the identified priority parameter, between a first type of indication of buffered data to be transmitted on an uplink carrier in the shared radio frequency spectrum band or the dedicated radio frequency spectrum band, or a second type of indication of buffered data to be transmitted on an uplink carrier in the dedicated radio frequency spectrum band. When the first type of indication is selected, the method 1600 may continue at block 1615. When the second type of indication is selected, the method 1600 may continue at block 1620. The operation(s) at block 1610 may be performed using the wireless communication manager 520, 620, 720, 820, or 920 or UE wireless communication manager 1050 described with reference to FIG. 5, 6, 7, 8, 9, or 10, the message type selector 540, 640, or 740 described with reference to FIG. 5, 6, or 7, or the BSR parameter selector 750 described with reference to FIG. 7.

At block 1615, the method 1600 may include transmitting the first type of indication (e.g., to a base station) in a first BSR. At block 1620, the method 1600 may include transmitting the second type of indication (e.g., to a base station) in a second BSR. In some examples, the first BSR or the second BSR may be transmitted in the dedicated radio frequency spectrum band. The operation(s) at block 1615 or 1620 may be performed using the wireless communication manager 520, 620, 720, 820, or 920 or UE wireless communication manager 1050 described with reference to FIG. 5, 6, 7, 8, 9, or 10, the transmission manager 545, 645, or 745 described with reference to FIG. 5, 6, or 7, or the BSR transmission manager 755 described with reference to FIG. 7.

In some examples of the method 1600, the data to be transmitted on the uplink carrier may be associated with a logical channel group, and the first type of indication or the second type of indication may be selected and transmitted for the logical channel group. In some examples, the method 1600 may be repeated for each of a plurality of logical channel groups associated with data to be transmitted on an uplink carrier, with the first type of indication or second type of indication being selected for each of the logical channel groups and being transmitted using the same set of BSRs.

In some examples, the method 1600 may include reclassifying the data to be transmitted on the uplink carrier upon expiration of a timer. For example, upon expiration of the timer, buffered data to be transmitted on an uplink carrier in the shared radio frequency spectrum band or the dedicated radio frequency spectrum band may be reclassified as buffered data to be transmitted on an uplink carrier in the dedicated radio frequency spectrum band (e.g., moved from the first buffer to the second buffer), or buffered data to be transmitted on an uplink carrier in the dedicated radio frequency spectrum band may be reclassified as buffered data to be transmitted on an uplink carrier in the shared radio frequency spectrum band or the dedicated radio frequency spectrum band (e.g., moved from the second buffer to the first buffer). Reclassifying data may enable data to be transmitted when there is congestion on a set of one or more uplink carriers in the shared radio frequency spectrum band or the dedicated radio frequency spectrum band (or in the case of one or more uplink carriers in the shared radio frequency spectrum band, an unavailability of one or more uplink carriers as a result of losing contention for access to the shared radio frequency spectrum band).

Thus, the method 1600 may provide for wireless communication. It should be noted that the method 1600 is just one implementation and that the operations of the method 1600 may be rearranged or otherwise modified such that other implementations are possible.

Figure 17:
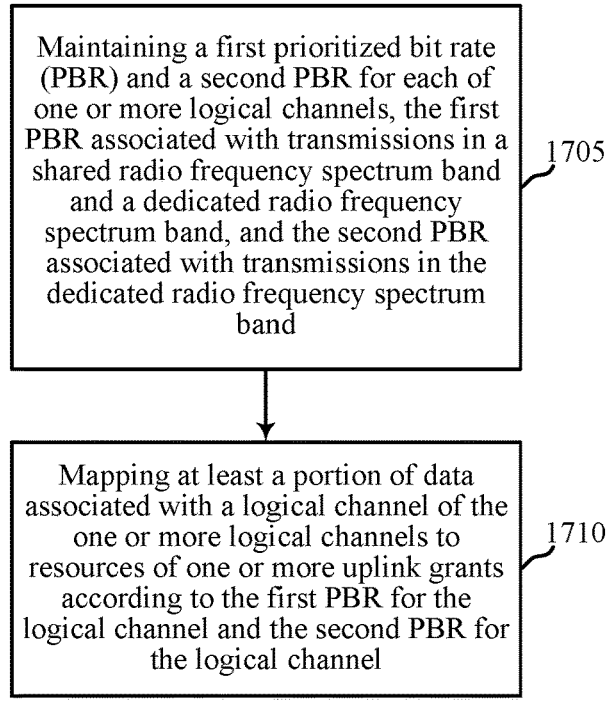
FIG. 17 is a flow chart illustrating an example of a method for wireless communication at a UE, in accordance with various aspects of the present disclosure.

FIG. 17 is a flow chart illustrating an example of a method 1700 for wireless communication at a UE, in accordance with various aspects of the present disclosure. For clarity, the method 1700 is described below with reference to aspects of one or more of the UEs 115, 215, 315, 415, or 1015 described with reference to FIG. 1, 2, 3, 4, or 10, or aspects of one or more of the apparatuses 515, 615, 715, 815, or 915 described with reference to FIG. 5, 6, 7, 8, or 9. In some examples, a UE may execute one or more sets of codes to control the functional elements of the UE to perform the functions described below. Additionally or alternatively, the UE may perform one or more of the functions described below using special-purpose hardware.

At block 1705, the method 1700 may include maintaining a first PBR and a second PBR for each of one or more logical channels. The first PBR may be associated with transmissions in a shared radio frequency spectrum band or a dedicated radio frequency spectrum band, and the second PBR may be associated with transmissions in the dedicated radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The operation(s) at block 1705 may be performed using the wireless communication manager 520, 620, 720, 820, or 920 or UE wireless communication manager 1050 described with reference to FIG. 5, 6, 7, 8, 9, or 10, or the PBR manager 835 described with reference to FIG. 8.

At block 1710, the method 1700 may include mapping at least a portion of data associated with a logical channel of the one or more logical channels to resources of one or more uplink grants according to the first PBR for the logical channel and the second PBR for the logical channel. The operation(s) at block 1710 may be performed using the wireless communication manager 520, 620, 720, 820, or 920 or UE wireless communication manager 1050 described with reference to FIG. 5, 6, 7, 8, 9, or 10, or the logical channel data to uplink grant resource mapper 840 described with reference to FIG. 8.

Thus, the method 1700 may provide for wireless communication. It should be noted that the method 1700 is just one implementation and that the operations of the method 1700 may be rearranged or otherwise modified such that other implementations are possible.

Figure 18:
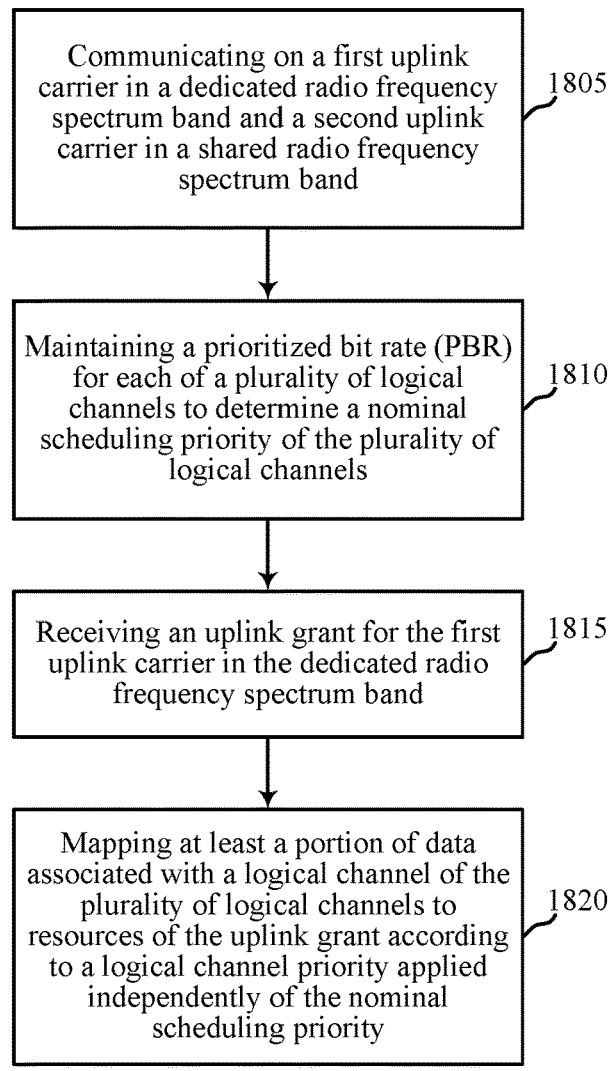
FIG. 18 is a flow chart illustrating an example of a method for wireless communication at a UE, in accordance with various aspects of the present disclosure.

FIG. 18 is a flow chart illustrating an example of a method 1800 for wireless communication at a UE, in accordance with various aspects of the present disclosure. For clarity, the method 1800 is described below with reference to aspects of one or more of the UEs 115, 215, 315, 415, or 1015 described with reference to FIG. 1, 2, 3, 4, or 10, or aspects of one or more of the apparatuses 515, 615, 715, 815, or 915 described with reference to FIG. 5, 6, 7, 8, or 9. In some examples, a UE may execute one or more sets of codes to control the functional elements of the UE to perform the functions described below. Additionally or alternatively, the UE may perform one or more of the functions described below using special-purpose hardware.

At block 1805, the method 1800 may include communicating on a first uplink carrier in a dedicated radio frequency spectrum band and a second uplink carrier in a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The operation(s) at block 1805 may be performed using the wireless communication manager 520, 620, 720, 820, or 920 or UE wireless communication manager 1050 described with reference to FIG. 5, 6, 7, 8, 9, or 10, or the uplink carrier manager 935 described with reference to FIG. 9.

At block 1810, the method 1800 may include maintaining a PBR (e.g., a single PBR for transmissions in the shared radio frequency spectrum band and the dedicated radio frequency spectrum band) for each of a plurality of logical channels to determine a nominal scheduling priority of the plurality of logical channels. The operation(s) at block 1810 may be performed using the wireless communication manager 520, 620, 720, 820, or 920 or UE wireless communication manager 1050 described with reference to FIG. 5, 6, 7, 8, 9, or 10, or the PBR manager 940 described with reference to FIG. 9.

At block 1815, the method 1800 may include receiving an uplink grant for the first uplink carrier in the dedicated radio frequency spectrum band. The operation(s) at block 1815 may be performed using the wireless communication manager 520, 620, 720, 820, or 920 or UE wireless communication manager 1050 described with reference to FIG. 5, 6, 7, 8, 9, or 10, or the uplink grant manager 945 described with reference to FIG. 9.

At block 1820, the method 1800 may include mapping at least a portion of data associated with a logical channel of the plurality of logical channels to resources of the uplink grant according to a logical channel priority applied independently of the nominal scheduling priority. In some examples, the at least portion of the data associated with the logical channel may include at least one of an upper layer retransmission, upper layer control information, or a TCP ACK. The operation(s) at block 1820 may be performed using the wireless communication manager 520, 620, 720, 820, or 920 or UE wireless communication manager 1050 described with reference to FIG. 5, 6, 7, 8, 9, or 10, or the logical channel data to uplink grant resource mapper 950 described with reference to FIG. 9.

Thus, the method 1800 may provide for wireless communication. It should be noted that the method 1800 is just one implementation and that the operations of the method 1800 may be rearranged or otherwise modified such that other implementations are possible.

In some examples, aspects of the method 1200, 1300, 1400, 1500, 1600, 1700, and/or 1800 described with reference to FIG. 12, 13, 14, 15, 16, 17, or 18 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein, but is to be accorded the broadest scope consistent with the principles and novel techniques disclosed herein.

What is claimed is:

1. A method for wireless communication at a user equipment (UE), comprising:
   maintaining a first prioritized bit rate (PBR) and a second PBR for each of one or more logical channels, the first PBR associated with transmissions in a shared radio frequency spectrum band and a dedicated radio frequency spectrum band, and the second PBR associated with transmissions in the dedicated radio frequency spectrum band; and
   mapping at least a portion of data associated with a logical channel of the one or more logical channels to resources of one or more uplink grants according to the first PBR for the logical channel and the second PBR for the logical channel.

2. The method of claim 1, wherein the dedicated radio frequency spectrum band is a radio frequency spectrum band for which transmitting apparatuses are not permitted to contend for access.

3. The method of claim 1, wherein the dedicated radio frequency spectrum band is a licensed radio frequency spectrum band usable for LTE/LTE-A communications.

4. The method of claim 1, wherein the shared radio frequency spectrum band is a radio frequency spectrum band for which transmitting apparatuses are permitted to contend for access.

5. The method of claim 1, wherein the shared radio frequency spectrum band is a radio frequency spectrum band that is available for unlicensed use.

6. The method of claim 1, wherein the at least portion of the data associated with the logical channel comprises at least one of: an upper layer retransmission, upper layer control information, or a Transmission Control Protocol (TCP) acknowledgement (ACK).

7. A method for wireless communication at a user equipment (UE), comprising:
   communicating on a first uplink carrier in a dedicated radio frequency spectrum band and a second uplink carrier in a shared radio frequency spectrum band;
   maintaining a prioritized bit rate (PBR) for each of a plurality of logical channels to determine a nominal scheduling priority of the plurality of logical channels;

receiving an uplink grant for the first uplink carrier in the dedicated radio frequency spectrum band; and mapping at least a portion of data associated with a logical channel of the plurality of logical channels to resources of the uplink grant according to a logical channel priority applied independently of the nominal scheduling priority.

8. The method of claim 7, wherein the dedicated radio frequency spectrum band is a radio frequency spectrum band for which transmitting apparatuses are not permitted to contend for access.

9. The method of claim 7, wherein the dedicated radio frequency spectrum band is a licensed radio frequency spectrum band usable for LTE/LTE-A communications.

10. The method of claim 7, wherein the shared radio frequency spectrum band is a radio frequency spectrum band for which transmitting apparatuses are permitted to contend for access.

11. The method of claim 7, wherein the shared radio frequency spectrum band is a radio frequency spectrum band that is available for unlicensed use.

12. The method of claim 7, wherein the at least portion of the data associated with the logical channel comprises at least one of: an upper layer retransmission, upper layer control information, or a Transmission Control Protocol (TCP) acknowledgement (ACK).

13. An apparatus for wireless communication at a user equipment (UE), comprising:

a processor;

memory in electronic communication with the processor; and the processor and memory configured to:

maintain a first prioritized bit rate (PBR) and a second PBR for each of one or more logical channels, the first PBR associated with transmissions in a shared radio frequency spectrum band and a dedicated radio frequency spectrum band, and the second PBR associated with transmissions in the dedicated radio frequency spectrum band; and map at least a portion of data associated with a logical channel of the one or more logical channels to resources of one or more uplink grants according to the first PBR for the logical channel and the second PBR for the logical channel.

14. The apparatus of claim 13, wherein the dedicated radio frequency spectrum band is a radio frequency spectrum band for which transmitting apparatuses are not permitted to contend for access.

15. The apparatus of claim 13, wherein the dedicated radio frequency spectrum band is a licensed radio frequency spectrum band usable for LTE/LTE-A communications.

16. The apparatus of claim 13, wherein the shared radio frequency spectrum band is a radio frequency spectrum band for which transmitting apparatuses are permitted to contend for access.

17. The apparatus of claim 13, wherein the shared radio frequency spectrum band is a radio frequency spectrum band that is available for unlicensed use.

18. The apparatus of claim 13, wherein the at least portion of the data associated with the logical channel comprises at least one of: an upper layer retransmission, upper layer control information, or a Transmission Control Protocol (TCP) acknowledgement (ACK).

* * * * *